United States Patent
Saito et al.

(10) Patent No.: US 7,958,478 B2
(45) Date of Patent: Jun. 7, 2011

(54) PRODUCTION METHOD, DESIGN METHOD AND DESIGN SYSTEM FOR SEMICONDUCTOR INTEGRATED CIRCUIT

(75) Inventors: Toshiyuki Saito, Kanagawa (JP); Tetsuo Yoshino, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 386 days.

(21) Appl. No.: 12/216,795

(22) Filed: Jul. 10, 2008

(65) Prior Publication Data
US 2009/0019408 A1    Jan. 15, 2009

(30) Foreign Application Priority Data
Jul. 11, 2007    (JP) ................................ 2007-182664

(51) Int. Cl.
*G06F 17/50*    (2006.01)
*G06F 9/455*    (2006.01)

(52) U.S. Cl. ........ 716/113; 716/104; 716/106; 716/108; 716/110; 716/111; 716/132; 716/134; 703/13; 703/14

(58) Field of Classification Search .................. 716/4–6, 716/18, 104–108, 110–113, 132, 134; 703/13–14
See application file for complete search history.

(56) References Cited

U.S. PATENT DOCUMENTS

| | | | | |
|---|---|---|---|---|
| 6,915,249 | B1 * | 7/2005 | Sato et al. ........................ | 703/14 |
| 7,239,997 | B2 * | 7/2007 | Yonezawa ........................ | 703/19 |
| 2005/0065765 | A1 | 3/2005 | Visweswariah | |
| 2007/0198235 | A1 * | 8/2007 | Takeuchi ........................ | 703/2 |

FOREIGN PATENT DOCUMENTS

| | | |
|---|---|---|
| JP | 2000-181944 | 6/2000 |
| JP | 2005-92885 | 4/2005 |
| WO | WO 02/059740 A1 | 8/2002 |

OTHER PUBLICATIONS

Kiyoshi Takeuchi, et al., "A Highly Efficient Statistical Compact Model Parameter Extraction Scheme", SISPAD 2005, Sep. 1-3, 2005, pp. 135-138.

* cited by examiner

*Primary Examiner* — Nghia M Doan
(74) *Attorney, Agent, or Firm* — McGinn IP Law Group, PLLC

(57) ABSTRACT

A production method for a semiconductor integrated circuit includes: creating a model parameter of an element constituting a cell, wherein the model parameter is defined by a design value and a distribution function of variability from the design value; performing a circuit simulation using the model parameter to create a response function that expresses response of cell characteristic to the model parameter; and creating a statistical cell library by using the response function. The statistical cell library used for circuit design and verification gives an expected value and statistical variation of the cell characteristic. The statistical variation is expressed by a product of the distribution function and sensitivity. The sensitivity is calculated based on the response function. When the model parameter is updated, the statistical cell library is updated by using the post-update model parameter and the response function without performing a circuit simulation.

16 Claims, 14 Drawing Sheets

PRODUCTION METHOD, DESIGN METHOD AND DESIGN SYSTEM FOR SEMICONDUCTOR INTEGRATED CIRCUIT

INCORPORATION BY REFERENCE

This application is based upon and claims the benefit of priority from Japanese patent application No. 2007-182664, filed on Jul. 11, 2007, the disclosure of which is embedded herein in its entirely by reference.

BACKGROUND OF THE INVENTION

1. Field of the Invention

The present invention relates to a technique of designing and producing a semiconductor integrated circuit. In particular, the present invention relates to a technique of designing and producing a semiconductor integrated circuit based on a statistical model.

2. Description of Related Art

In a manufacturing stage of a semiconductor integrated circuit, physical parameters and electrical characteristics of an element such as a transistor generally vary from their design values. Such variations are called manufacturing variability. In order to ensure a normal operation of the manufactured semiconductor integrated circuit, it is important to take the manufacturing variability into consideration at a circuit design/verification stage.

For example, according to a typical STA (Static Timing Analysis), a timing analysis is performed by using a delay value at a corner condition (worst condition). That is to say, a certain margin corresponding to the manufacturing variability is taken into consideration. By designing the circuit such that given timing constraints are met even under the corner condition, delay variations caused by the manufacturing variability can be absorbed. However, to design the circuit such that the given timing constraints are met even under the corner condition leads to increase in design time.

Therefore, it has been proposed in recent years to introduce "statistical approach" to the circuit design/verification in order to treat the manufacturing variability more efficiently and optimize the design margin.

A method of statistically expressing model parameters (SPICE model parameters) used in the SPICE (Simulation Program with Integrated Circuit Emphasis) is described in a paper: Kiyoshi Takeuchi and Masami Hane, "A Highly Efficient Statistical Compact Model Parameter Extraction Scheme", SISPAD 2005, 1-3 Sep. 2005, pp. 135-138. More specifically, a principal component analysis is performed with respect to I-V characteristics of a plurality of samples to determine statistical model parameters. The statistical model parameters are used in the SPICE simulation, and thereby the simulation accuracy is improved.

A similar method is also disclosed in PCT Publication No. WO02/059740. Statistical model parameters are determined by a principal component analysis. Here, global manufacturing variability between chips and local manufacturing variability (OCV: On-Chip Variation) within a chip are considered separately from each other.

Japanese Laid-Open Patent Application No. 2005-92885 discloses a method of SSTA (Statistical STA). More specifically, a delay model of a cell is given by a linear function. The linear function is a function of delay variation factors. The cell delay model is used to perform the statistical (stochastic) timing analysis.

Japanese Laid-Open Patent Application No. 2000-181944 discloses a method of creating a cell delay library. First, cell delay values at various conditions are calculated by performing a circuit simulation. Next, a RSF (Response Surface Function) that expresses the cell delay value is generated by using the least squares method. Moreover, coefficients of the RSF are corrected by referring to actual measurement data.

The inventors of the present application have recognized the following points. The statistical approach that can efficiently treat the manufacturing variability is indispensable for improving accuracy and reducing time of the circuit design/verification. To this end, it is important to model the elements and cells by considering the manufacturing variability statistically. Such modeling in which the manufacturing variability is statistically considered is referred to as "statistical modeling" hereinafter.

Meanwhile, a manufacturing process of the semiconductor integrated circuit is progressing from day to day. With maturation of the manufacturing process, the manufacturing variability is supposed to be improved. When the manufacturing variability is improved, it is possible to reduce the margin to be considered in the circuit design/verification. This leads to reduction in the circuit area and power consumption. It is therefore desirable to perform the statistical modeling of the cell again in accordance with the maturation of the manufacturing process.

Moreover, there may be a case where impurity concentrations of wells and diffusion layers are adjusted and thus the transistor characteristics are changed. It is desirable to perform the statistical modeling of the cell again also in such a case where the manufacturing process is purposely changed.

However, the modeling (characterization) of the cell requires tremendous amounts of processes, time and costs. If re-characterization is not performed in order to save the time and costs, it means that the latest manufacturing process is not reflected in the circuit design/verification. In other words, even when the manufacturing variability is improved due to the maturation of the manufacturing process, the margin to be considered in the circuit design/verification is unchanged and thus the effects of reduction in the circuit area and power consumption cannot be obtained. This means that the semiconductor integrated circuit is unable to demonstrate its true abilities corresponding to the maturity of the manufacturing process.

Therefore, a technique is desired that can "update" the statistical cell model (statistical cell library) easily without performing the re-characterization when the manufacturing process is changed. In other words, a technique is desired that can promptly update the statistical cell model in accordance with the maturation and intended change of the manufacturing process.

SUMMARY

In one embodiment of the present invention, a production method for a semiconductor integrated circuit is provided. The production method includes: creating a model parameter of an element constituting a cell; performing a circuit simulation using the model parameter to create a response function that expresses response of the cell characteristic to the model parameter; creating a statistical cell library by using the response function; designing and verifying a semiconductor integrated circuit by using the statistical cell library; and manufacturing the designed semiconductor integrated circuit.

The model parameter is defined by a design value and a distribution function of variability from the design value. The statistical cell library gives an expected value and statistical variation of the cell characteristic. The statistical variation of the cell characteristic is expressed by a product of the distribution function mentioned above and sensitivity. The sensitivity is calculated based on the response function mentioned above.

Let us consider a case where the model parameter is changed (updated) in accordance with the maturation or intended change of the manufacturing process. In this case, it is possible to promptly reflect the update of the distribution function that defines the model parameter in the statistical variation of the cell characteristic. The reason is that both of the model parameter and the statistical variation of the cell characteristic are expressed by using the same distribution function. Moreover, the sensitivity corresponding to the post-update model parameter can be calculated promptly by using the response function that is created in advance. In this manner, it is possible to promptly "update" the statistical cell library without performing a circuit simulation, when the model parameter is changed. There is no need to perform the re-characterization of the cell.

As described above, it is possible to promptly update the statistical cell library in accordance with the maturation and change of the manufacturing process. In other words, the latest manufacturing process can be immediately reflected in the circuit design/verification. Therefore, it is possible to efficiently develop the semiconductor integrated circuit.

In another embodiment of the present invention, a design method for a semiconductor integrated circuit is provided. The design method includes: creating a model parameter of an element constituting a cell; performing a circuit simulation using the model parameter to create a response function that expresses response of the cell characteristic to the model parameter; and creating a statistical cell library by using the response function. The model parameter is defined by a design value and a distribution function of variability from the design value. The statistical cell library gives an expected value and statistical variation of the cell characteristic. The statistical variation is expressed by a product of the distribution function mentioned above and sensitivity. The sensitivity is calculated based on the response function mentioned above. The design method further includes: updating the statistical cell library when the model parameter is updated, wherein the statistical cell library is updated by using the post-update model parameter and the response function without performing a circuit simulation. The statistical cell library is used for designing and verifying a semiconductor integrated circuit.

According to the present invention, it is possible to promptly update the statistical cell library in accordance with the maturation and change of the manufacturing process. In other words, it is possible to immediately reflect the latest manufacturing process in the circuit design/verification.

BRIEF DESCRIPTION OF THE DRAWINGS

The above and other objects, advantages and features of the present invention will be more apparent from the following description of certain preferred embodiments taken in conjunction with the accompanying drawings, in which.

DETAILED DESCRIPTION OF PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

1. Outline

Figure 1:
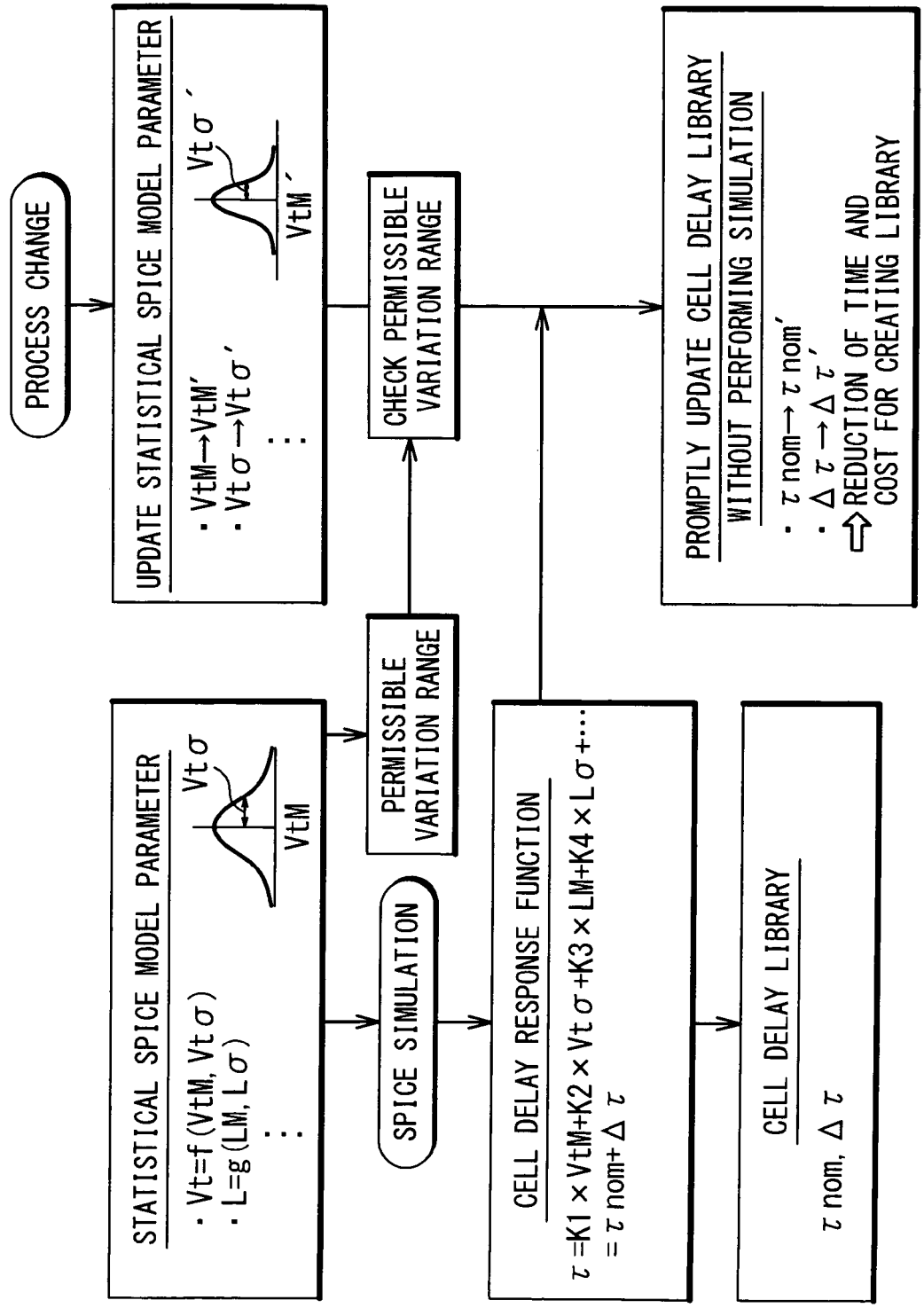
FIG. 1 is a conceptual diagram showing an embodiment of the present invention.

FIG. 1 conceptually shows an embodiment of the present invention. As an example of the statistical cell library, a cell delay library that statistically gives a delay value of a cell is considered. A method of creating and updating the cell delay library is shown in FIG. 1.

First, a statistical model of a transistor that constitutes the cell is provided. More specifically, statistical SPICE model parameters used in the statistical SPICE are created and determined. For example, a threshold voltage Vt which is one of the SPICE model parameters is expressed as a function of a design value (nominal value, targeted value) VtM and a variability parameter Vt$\sigma$. The variability parameter Vt$\sigma$ is a parameter that defines a distribution function of the threshold voltage Vt. Similarly, a gate length L which is another one of the SPICE model parameters is expressed as a function of a design value LM and a variability parameter L$\sigma$. These statistical SPICE model parameters are determined based on actual measurement values, for example. Moreover, a permissible variation range is calculated, where the permissible variation range is an index of a variation range covered by the created statistical SPICE model parameters.

A cell delay $\tau$ (cell characteristic) can be expressed in a form of a "response function" that expresses response to the statistical SPICE model parameters. For example, the cell delay $\tau$ is expressed as a linear function of the design values (e.g. VtM and LM) and variability parameters (e.g. Vt$\sigma$ and L$\sigma$) mentioned above. Parameters K1, K2 . . . are response coefficients. Meanwhile, various kinds of cell delay $\tau$ can be calculated by the SPICE simulation using various combinations of the statistical SPICE model parameters. By fitting the various cell delays $\tau$ obtained through the SPICE simulation with the above-mentioned response function, the response coefficients K1, K2 . . . are determined. In this manner, the response function that expresses the cell delay τ is created.

The cell delay τ can be expressed by a sum of an expected value (nominal value) τnom and statistical variation Δτ. The nominal value τnom and the statistical variation Δτ are obtained by using the statistical SPICE model parameters and the response function. In this manner, the cell delay library that gives the nominal value τnom and the statistical variation Δτ is created.

Next, let us consider a case where the manufacturing process is changed (updated). In this case, the design values (e.g. VtM) and the variability parameters (e.g. Vtσ) in the statistical SPICE model parameters may be changed (updated) to new ones (e.g. VtM' and Vtσ'). For example, when the manufacturing process is matured, the variability parameters typically become smaller. In accordance with the change in the statistical SPICE model parameters, the cell delay library also needs to be changed (updated).

First, a post-update variation range that is an index of a variation range covered by the post-update statistical SPICE model parameters is calculated. If the post-update variation range is within the above-mentioned permissible variation range, the cell delay library can be updated without performing the re-characterization of the cell. More specifically, a new nominal value τnom' and new statistical variation Δτ' of the cell delay τ corresponding to the post-update statistical SPICE model parameters can be calculated by using the above-mentioned response function. It should be noted here that both of the statistical SPICE model parameter and the response function are given by respective analytic functions depending on the same variables. Therefore, the post-update nominal value τnom' and statistical variation Δτ' can be calculated immediately. In other words, it is possible to promptly update the cell delay library without performing the SPICE simulation. There is no need to perform the re-characterization of the cell.

As described above, it is possible to promptly update the cell delay library in accordance with the maturation and change of the manufacturing process. That is to say, the latest manufacturing process can be immediately reflected in the circuit design/verification. Accordingly, it is possible to efficiently develop the semiconductor integrated circuit. Since the margin to be considered in the circuit design/verification is reduced when the manufacturing variability is improved due to the maturation of the manufacturing process, effects of reduction in the circuit area and power consumption can be obtained.

Figure 2:
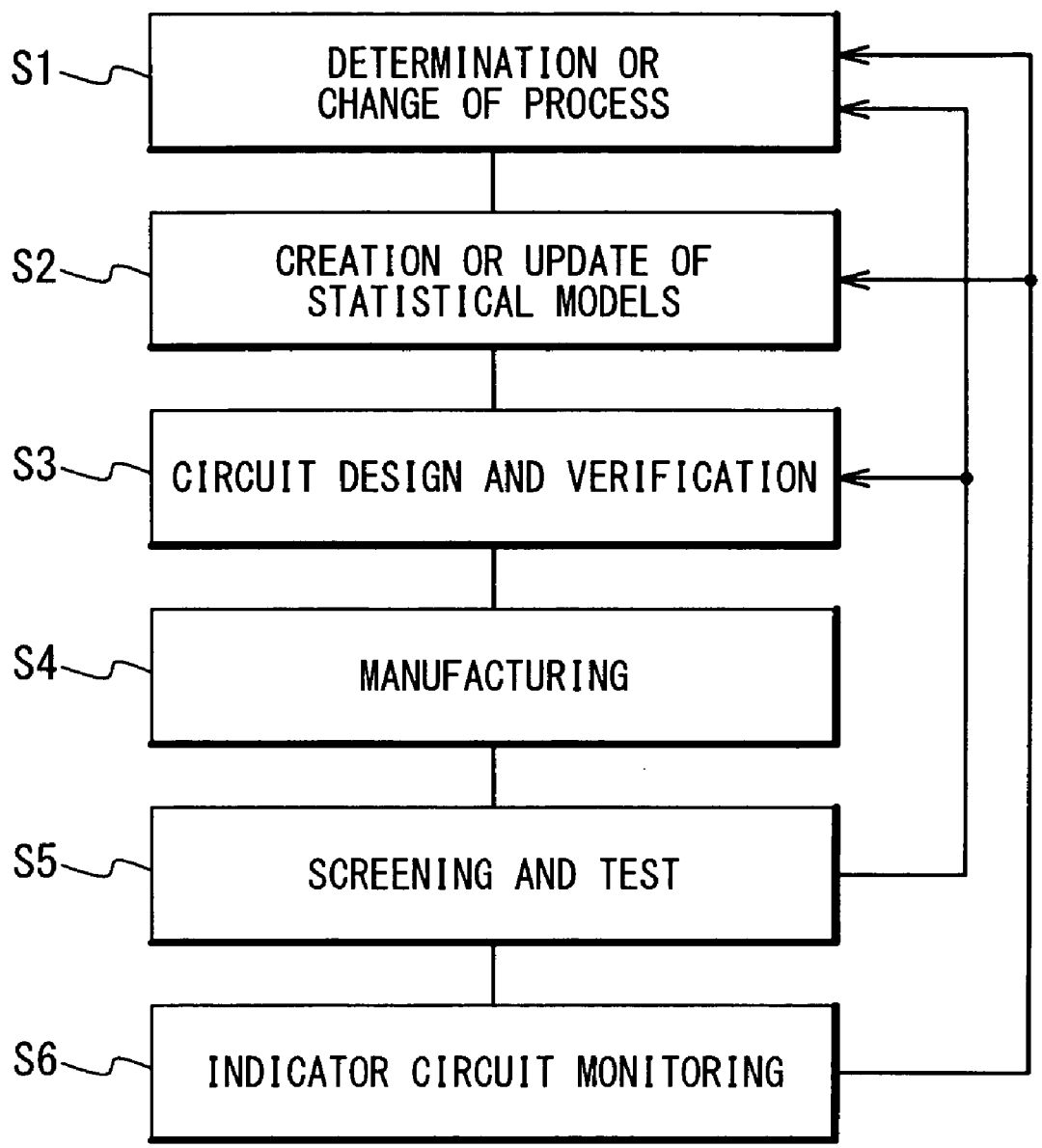
FIG. 2 is a flowchart showing a method of developing and producing a semiconductor integrated circuit according to the present embodiment.

FIG. 2 is a flowchart showing a summary of a method of developing and producing the semiconductor integrated circuit according to the present embodiment. In Step S1, the manufacturing process is determined or changed. In Step S2, statistical models corresponding to the determined manufacturing process are created, or statistical models are updated in accordance with the change in the manufacturing process. Here, the statistical models mean the statistical model parameters and the statistical cell library (statistical cell model).

In Step S3, the semiconductor integrated circuit is designed on the basis of a cell-based design technique, and design verification such as timing analysis is performed. Here, the design and verification of the semiconductor integrated circuit are performed efficiently by using the statistical cell library obtained in the foregoing Step S2. Moreover, since the statistical cell library is used, probability of meeting timing constraints can be calculated (the probability is referred to as a "timing yield predicted value" hereinafter).

In Step S4, the designed semiconductor integrated circuit is manufactured. In Step S5, screening and test of the manufactured semiconductor integrated circuit are performed. At this time, an actual timing yield is obtained. Therefore, the actual timing yield can be compared with the timing yield predicted value calculated in the foregoing Step S3. Furthermore, a result of the comparison can be fed-back to the circuit design/verification (Step S3) and/or the manufacturing process (Step S1).

In Step S6, actual manufacturing variability is monitored by measuring an operation of an indicator circuit embedded in the semiconductor integrated circuit. Based on a result of the monitoring, it is possible to assess the validity of the statistical models created in the foregoing Step S2. It is also possible to determine improving the statistical models and/or changing the manufacturing process. That is to say, the monitoring result can be fed-back to the statistical models (Step S2) and/or the manufacturing process (Step S1).

As described above, the present embodiment provides useful processing related to the maturation and change of the manufacturing process. It is not limited to the aforementioned update of the statistical cell library but includes the feed-back of the results of Steps S5 and S6 to the manufacturing process. In that sense, the system shown in FIG. 2 may be referred to as a "process maturity feed-back system". The process maturity feed-back system is a system for developing and producing a semiconductor integrated circuit, into which the change in the manufacturing process is incorporated.

The process maturity feed-back system according to the present embodiment will be described below in more detail. In the second section, Step S2 will be explained. In the third section, Step S3 will be explained. In the fourth section, Step S4 will be explained. In the fifth section, Step S5 will be explained. In the sixth section, Step S6 will be explained. In the seventh section, a computer system for achieving the process maturity feed-back system will be explained.

2. Creation/Update of Statistical Model (Step S2)

First of all, terms used in the following description are defined. An elementary circuit means an electronic circuit which includes transistors and/or passive elements and has a predetermined function. The elementary circuit may be simply referred to as a "cell". The cell is roughly classified into two types: a primitive logic circuit and a core macro circuit. The primitive logic circuit is an electronic circuit having a simple logic function (e.g. AND gate, OR gate, NOR gate, flip-flop etc.). On the other hand, the core macro circuit is an electronic circuit having a specific function and used normally (e.g. memory, PLL, analog circuit).

Elements (devices) which constitute a cell include transistors and/or passive elements. Electrical characteristics of an element are referred to as "device characteristics" hereinafter. The device characteristics include electrical characteristics of a transistor (e.g. threshold voltage Vt, ON-current Ion, gate capacitance Cgg etc.) and electrical characteristics of a passive element (e.g. C and R). On the other hand, physical parameters of an element that are obtained as a result of the manufacturing are referred to as "process parameters" hereinafter. The process parameters include a gate length L, a gate width W, a gate oxide film thickness Tox and the like. The process parameters contribute to the device characteristics.

According to the SPICE simulation, the device characteristics of an element can be calculated by giving "SPICE model parameters". For example, the SPICE model parameters include a gate length L, a gate width W, a threshold voltage Vt and a mobility μ of a transistor. That is, the SPICE model parameters of an element specify characteristics of the element. According to the present embodiment, SPICE model parameters in which the manufacturing variability is statistically considered are created (refer to Section 2-2). Such SPICE model parameters are referred to as "statistical model parameters (or statistical SPICE model)" hereinafter.

According to the cell-based design technique, a cell library (cell model) that expresses characteristics of a cell is provided. The cell characteristics include a delay time (cell delay), power and the like. A cell delay library that gives the delay time of a cell is one example of the cell library. A cell power library that gives the power of a cell is another example of the cell library. According to the present embodiment, a cell library in which the manufacturing variability is statistically considered is created (refer to Section 2-5). Such a cell library is referred to as a "statistical cell library (or statistical cell model)" hereinafter.

In Step S2, statistical models are created or updated. Here, the statistical models include the "statistical model parameters" at the device level and the "statistical cell library" at the cell level.

Figure 3:
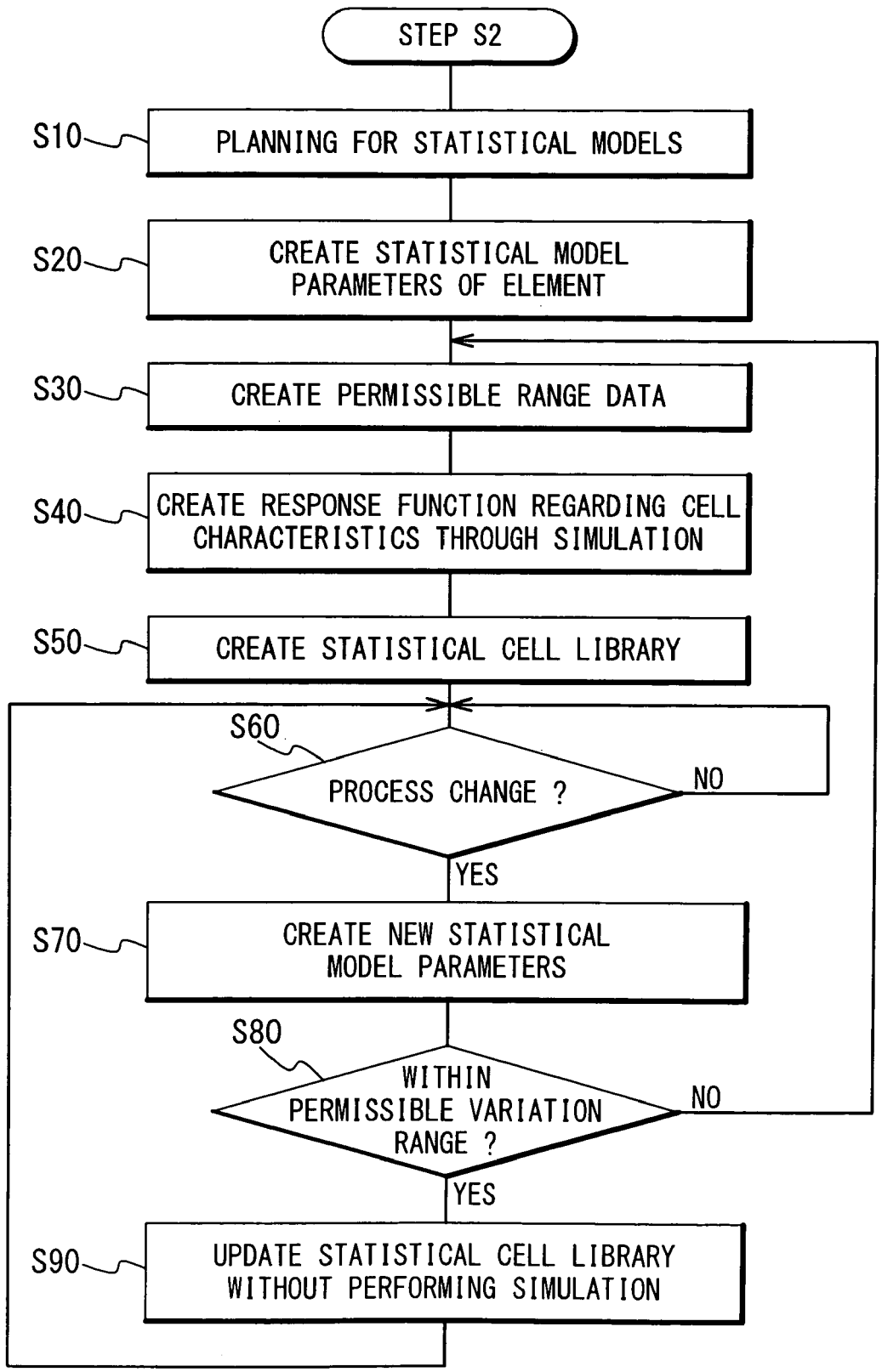
FIG. 3 is a flowchart showing processing in Step S2.
Figure 4:
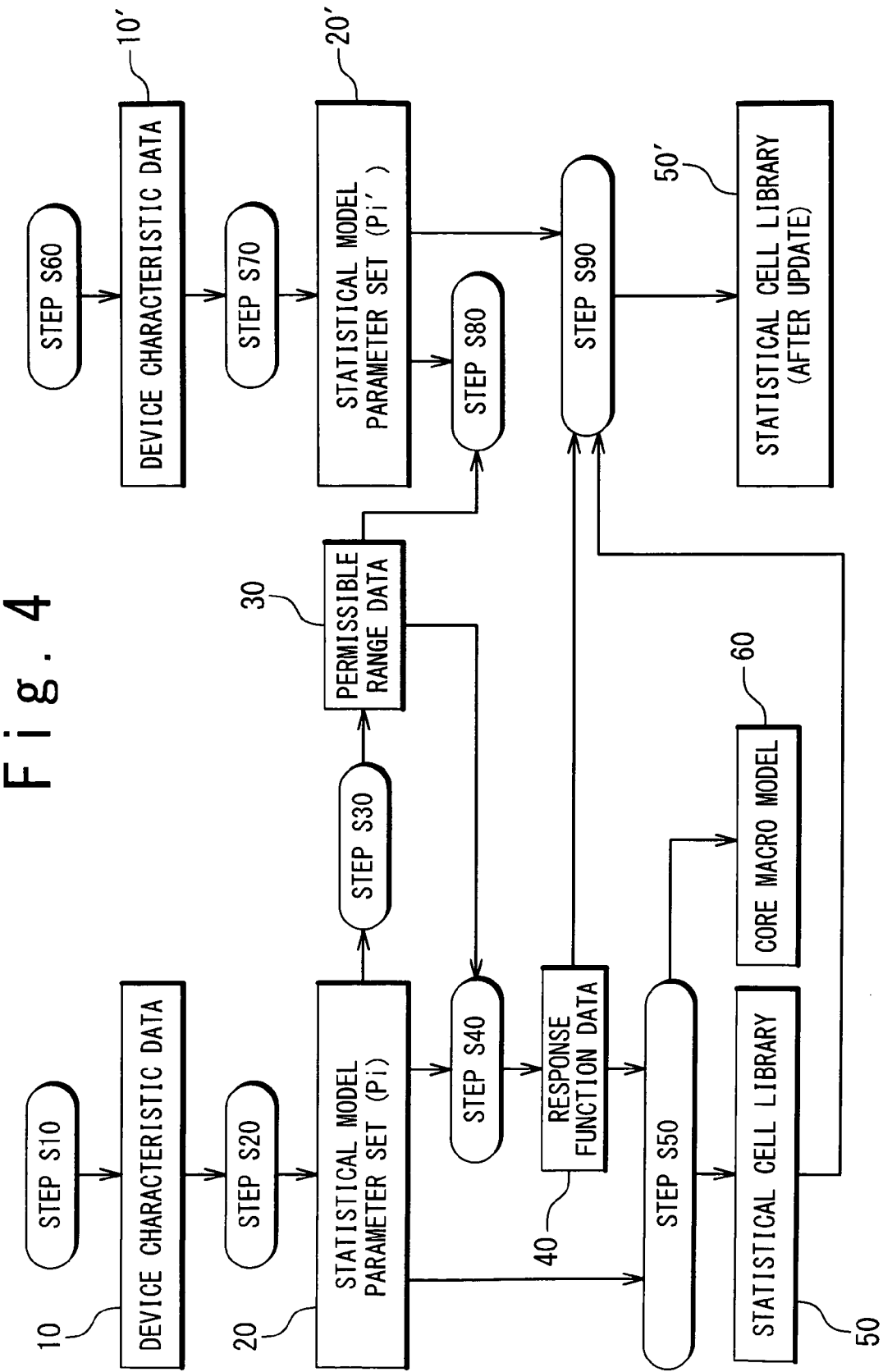
FIG. 4 is a conceptual diagram showing data flow in Step S2.

FIG. 3 is a flowchart showing processing in Step S2. FIG. 4 is a conceptual diagram showing data flow in Step S2. Step S2 will be explained in detail with reference to FIGS. 3 and 4 as appropriate. Step S2 is roughly divided into two flows: the first one is associated with a condition before the process change (i.e. an initial condition of a manufacturing process), while the second one is associated with a condition after the process change (i.e. a certain period after the operation of the manufacturing process)

2-1. Planning (Step S10)

In Step S10, what kinds of statistical models are created is determined. For example, statistical model parameters (e.g. L and Vt) to be created are determined. Also, for what kinds of elements (devices) statistical model parameters are created is determined. For example, if there is a possibility that plural types of transistors having process parameters of different design values are used, the statistical model parameters are created for each type of the transistors.

Next, an actual measurement of specified device characteristics is made with respect to a lot of elements of the same type. At this time, the actual measurement values of the device characteristics vary due to the manufacturing variability. That is, a distribution of the device characteristics is obtained. The distribution of the device characteristics is provided as a device characteristic data 10. It can be said that the device characteristic data 10 indicates variability of the device characteristics corresponding to the manufacturing variability. The device characteristic data 10 is created for each type of elements. It should be noted that a bias voltage and a temperature may be set to various conditions when the device characteristics are measured. In this case, the distribution of the device characteristics is further expanded.

The device characteristic data 10 is used for creating the statistical model parameters (refer to the next section 2-2). It can be said that a variation range which can be covered by the statistical model parameters to be created is determined by the device characteristic data 10. Therefore, the measuring objects whose device characteristics are measured are determined depending on the variability to be considered. The variability can be classified into two types: the first one is global variability between chips, while the second one is local variability within one chip (i.e. OCV: On-Chip Variation).

It should be noted that the device characteristic data 10 may be created through a device simulation. In this case, a certain range (amplitude from a design value) is set with respect to each of the process parameters. The device simulation is performed with changing the process parameters within the respective ranges, and thereby a distribution of predicted values of the device characteristics can be obtained. The obtained distribution of the device characteristics is provided as the device characteristic data 10.

Furthermore, an indicator circuit to be embedded in the semiconductor integrated circuit is selected in Step S10. The indicator circuit is an electronic circuit that is used as a representative for examining operation and performance of a manufactured semiconductor integrated circuit. In the present embodiment, the indicator circuit is used also for monitoring variability of the device characteristics. The indicator circuit is exemplified by a single transistor or a ring oscillator.

2-2. Statistical Model Parameters (Step S20)

Modeling of an element included in a cell is first explained. In Step S20, the statistical model parameters are created for each type of elements on the basis of the device characteristic data 10 mentioned above. More specifically, Np pieces of statistical model parameters $P_i$ are created (i=1 to Np). In the present embodiment, a statistical model parameter $P_i$ is expressed as the following equation (1).

$$P_i = P_{io} + \Delta P_i \quad (1)$$

$$= P_{io} + \sum_{k=1}^{M} G_{ik} \cdot N_k(\mu, \sigma)$$

Here, $P_{io}$ is a design value (nominal value, targeted value) of the statistical model parameter $P_i$. The design value $P_{io}$ is determined (extracted) such that a mean value (nominal value) of the device characteristic distribution indicated by the device characteristic data 10 can be obtained.

Variation $\Delta P_i$ ($=P_i-P_{io}$) from the design value $P_{io}$ of the statistical model parameter $P_i$ is expressed as a combination of M pieces of variability factor variables $N_k$ (k=1 to M). Each variability factor variable $N_k$ can be a factor of the variation $\Delta P_i$ of the statistical model parameter $P_i$. Each variability factor variable $N_k$ is expressed as a normal distribution (distribution function) with a mean value $\mu$ and a standard deviation $\sigma$. For example, each variability factor variable $N_k$ is expressed as a standard normal distribution (mean value=0, variance=1). $G_{i,k}$ is a coefficient matrix that represents degree of contribution of each variability factor variable $N_k$.

Figure 5:
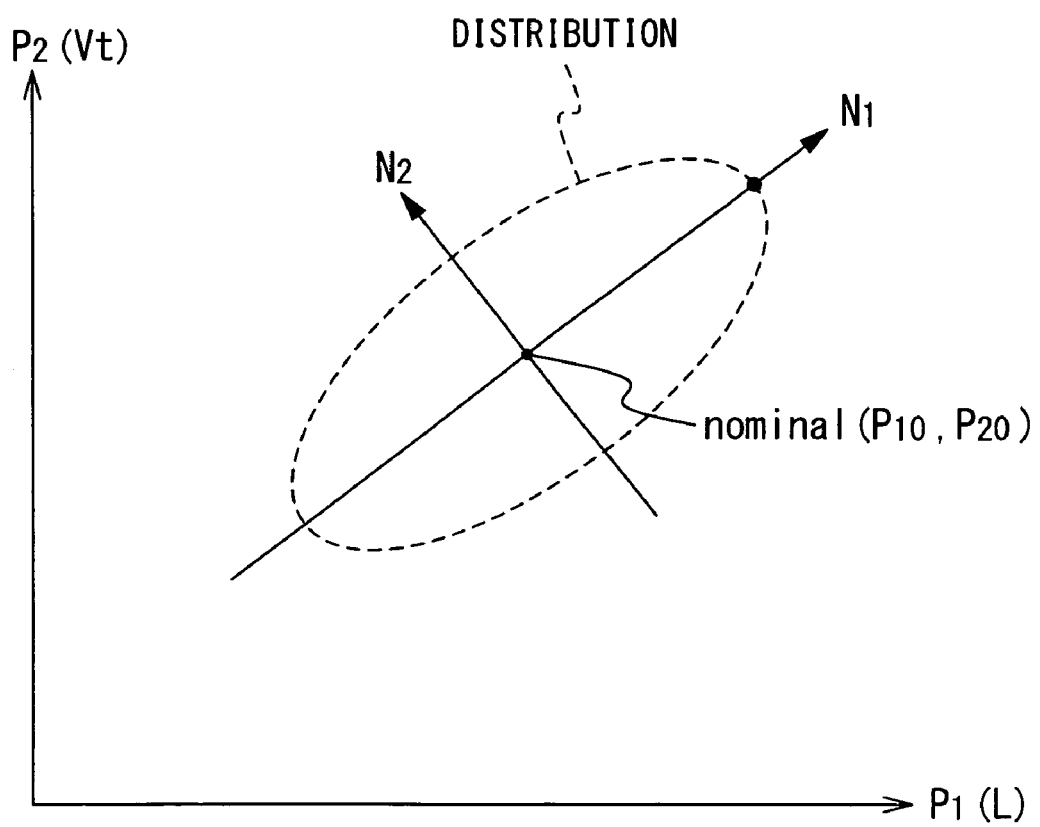
FIG. 5 is a conceptual diagram for explaining statistical model parameters.

FIG. 5 conceptually shows a relationship between the statistical model parameters $P_i$ and the variability factor variables $N_k$. Shown as an example in FIG. 5 is a distribution of two statistical model parameters $P_1$ (e.g. gate length L) and $P_2$ (e.g. threshold voltage Vt) with regard to a certain transistor. Principal components of the distribution are associated with the variability factor variables $N_k$. Each of the statistical model parameters $P_1$ and $P_2$ can be expressed as a linear combination of two variability factor variables $N_1$ and $N_2$ (i.e. principal components).

The variability factor variables $N_k$ and the coefficient matrices $G_{i,k}$ are determined (extracted) such that the distribution of the statistical model parameters $P_i$ is consistent with the device characteristic distribution indicated by the device characteristic data 10. More specifically, a principal component analysis is first performed with respect to the device characteristic distribution indicated by the device characteristic data 10. As a result, eigenvectors and corresponding eigenvalues that represent principal components contributing to the device characteristic variability are calculated. Then, M pieces of the calculated eigenvectors are selected and determined as the M pieces of variability factor variables $N_k$. Consequently, a form of the above-described equation (1) is determined. Moreover, the coefficient matrices $G_{i,k}$ are determined such that variance of the principal component of the statistical model parameters $P_i$ is consistent with variance of the principal component of the device characteristic variability. The statistical model parameter $P_i$ is expressed as a linear combination of the respective variability factor variables $N_k$.

A method to extract statistical model parameters using a principal component analysis is also described in Kiyoshi Takeuchi and Masami Hane, "A Highly Efficient Statistical Compact Model Parameter Extraction Scheme", SISPAD 2005, 1-3 Sep. 2005, pp. 135-138. Refer to that document for more details.

As shown in the above equation (1), a statistical model parameter $P_i$ is defined by the design value $P_{io}$ and the distribution function of the variability from the design value $P_{io}$. The statistical model parameters $P_i$ are so created as to represent the device characteristic variability indicated by the device characteristic data 10. Then, a statistical model parameter set 20 that is a set of the statistical model parameters $P_i$ is provided for each type of elements. By using the statistical model parameter set 20 and a cell netlist, it is possible to simulate electrical characteristics variability of the cell with high accuracy.

2-3. Permissible Range Data (Step S30)

Next, a permissible range data 30 is created with respect to the created statistical model parameter set 20. The permissible range data 30 provides an index of a variation range covered by the created statistical model parameters $P_i$. The index is referred to as a "permissible variation range RP" hereinafter.

Figure 6:
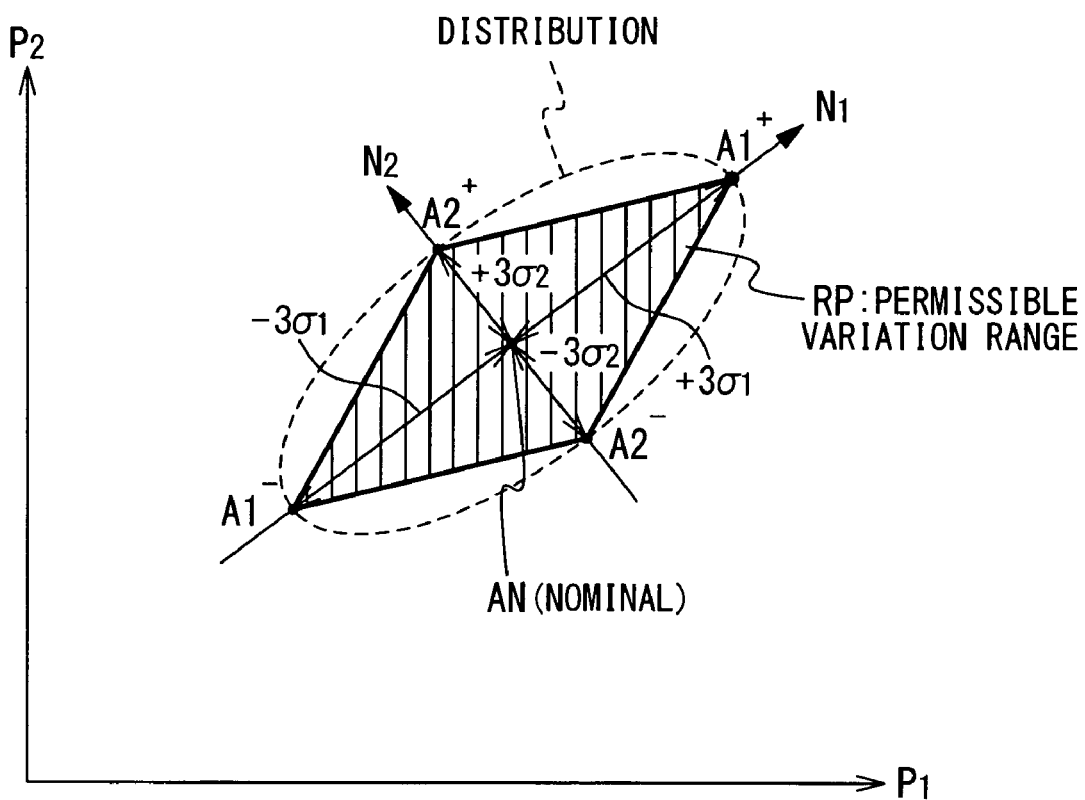
FIG. 6 is a conceptual diagram showing an example of a permissible variation range with regard to one kind of element.

FIG. 6 conceptually shows an example of the permissible variation range RP with regard to the statistical model parameters $P_i$ of a certain transistor. For simplicity, let us consider a model parameter space defined by the two statistical model parameters $P_1$ and $P_2$ as in the case of FIG. 5. The statistical model parameters $P_i$ have a certain distribution in the model parameter space. Principal component directions of the distribution include a "first principal component direction" associated with the variability factor variable $N_1$ and a "second principal component direction" associated with the variability factor variable $N_2$.

In FIG. 6, a point AN indicates a nominal value. The statistical model parameters $P_i$ are distributed centering around the point AN. Here, a certain range (permissible variation amount) along the principal component direction of the distribution is considered. For example, when a standard deviation of the distribution along each principal component direction is $\sigma_k$, the certain range is set to $\pm 3\sigma_k$ from the nominal value AN. In FIG. 6, a maximum value and a minimum value of the range along the first principal component direction are represented by points $A1^+$ and $A1^-$, respectively. On the other hand, a maximum value and a minimum value of the range along the second principal component direction are represented by points $A2^+$ and $A2^-$, respectively.

In this case, the permissible variation range RP is a rectangle defined by the four points $A1^+$, $A1^-$, $A2^+$ and $A2^-$. This permissible variation range RP is an index of a variation range covered by the statistical model parameters $P_1$ and $P_2$. The permissible range data 30 indicates, for example, respective coordinates of the four points $A1^+$, $A1^-$, $A2^+$ and $A2^-$ by which the permissible variation range RP can be defined.

In a case where plural types of elements are used, the permissible range data 30 is created with respect to the whole of the statistical model parameter sets 20 of the plural types of elements. That is to say, a larger permissible variation range (referred to as "permissible maximum variation range RPM") including all the permissible variation ranges RP regarding the plural types of elements is calculated.

Figure 7:
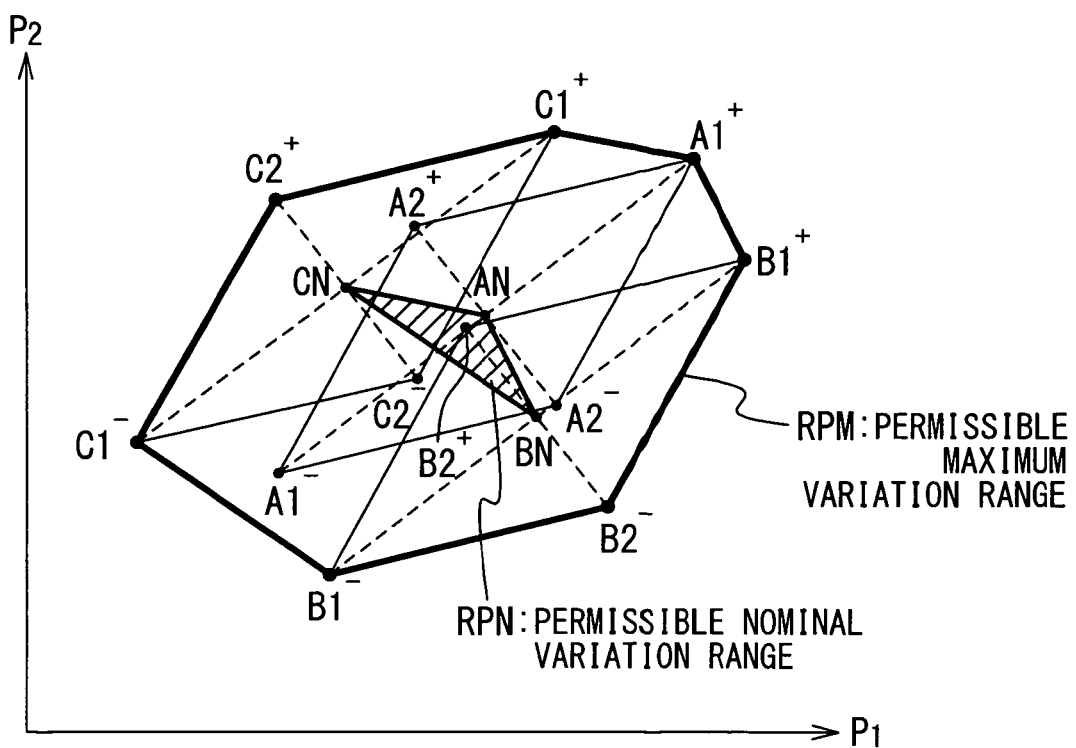
FIG. 7 is a conceptual diagram showing an example of a permissible variation range with regard to plural kinds of elements.

FIG. 7 conceptually shows an example of the permissible maximum variation range RPM in the case of the plural types of elements. As an example, three types of transistors (TRA, TRB and TRC) having different diffusion conditions are considered. Points AN, BN and CN indicate nominal values with regard to the transistors TRA, TRB and TRC, respectively. As in the case of FIG. 6, points representing maximum values and minimum values of the certain range along the principal component directions are extracted with respect to each type of transistor. Regarding the transistor TRA, four points $A1^+$, $A1^-$, $A2^+$ and $A2$ are extracted. Regarding the transistor TRB, four points $B1^+$, $B1^-$, $B2^+$ and $B2^-$ are extracted. Regarding the transistor TRC, four points $C1^+$, $C1^-$, $C2^+$ and $C2^-$ are extracted.

In this case, the permissible maximum variation range RPM is a convex polygon that is defined by outermost circumference points among the plurality of points in the model parameter space. In the example shown in FIG. 7, the permissible maximum variation range RPM is a convex polygon defined by the points $A1^+$, $B1^+$, $B2^-$, $B1^-$, $C1^-$, $C2^+$ and $C1^+$. Moreover, as shown in FIG. 7, a "permissible nominal variation range RPN" that is surrounded by the points AN, BN and CN representing the respective nominal values can also be defined. The permissible range data 30 indicates, for example, respective coordinates of the points by which the permissible maximum variation range RPM and the permissible nominal variation range RPN can be defined.

It should be noted that the permissible variation range may be classified into two types: the first one is a permissible global variation range associated with the global variability between chips, while the second one is a permissible local variation range associated with the local variability within one chip. The permissible nominal variation range RPN is a permissible variation range associated with variability of the nominal values. It can be said that the permissible maximum variation range RPM is the one including all of the permissible global variation range, the permissible local variation range and the permissible nominal variation range RPN.

Figure 8:
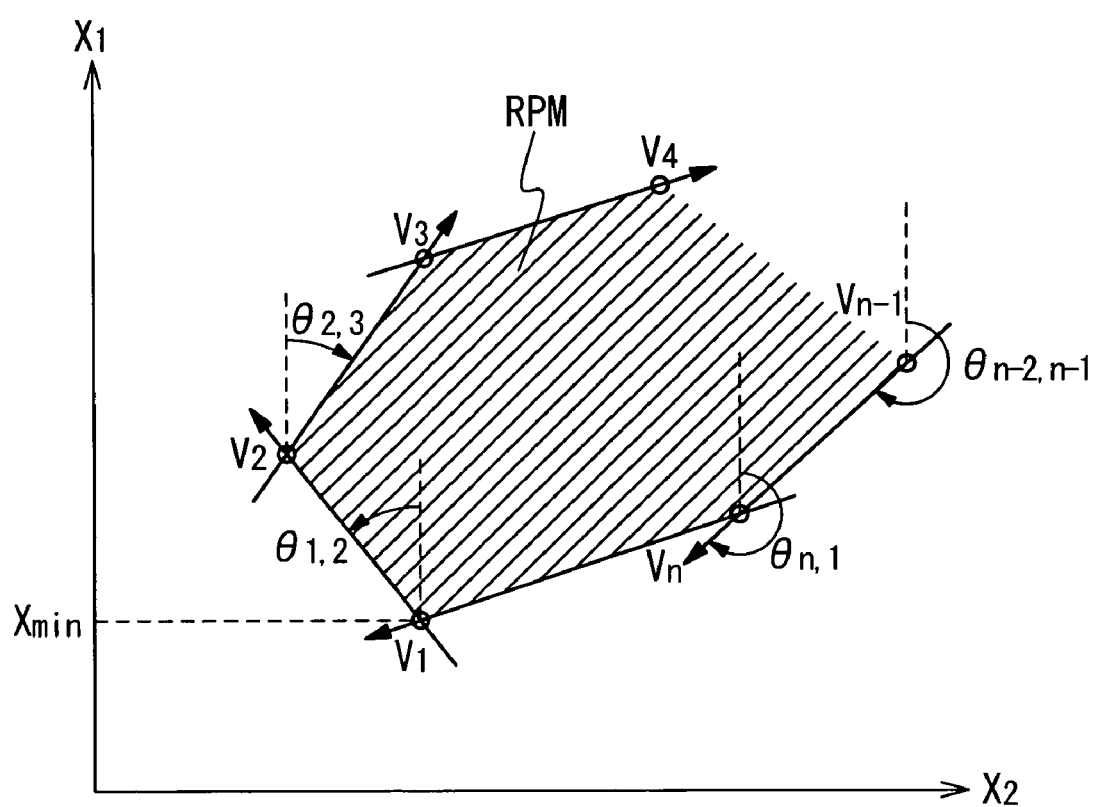
FIG. 8 is a conceptual diagram showing an example of a method of determining the permissible variation range.

Various methods are possible for searching for the outermost circumference points defining the convex polygon among the plurality of points in the model parameter space. For example, a widely-known Gift Wrapping method is applied. The method is explained with reference to FIG. 8.

(1) First, adopt a point ($V_1$) that takes a minimum value (Xmin) on a first coordinate axis $X_1$.

(2) Next, adopt a point ($V_2$) with which a minimum angle between the first coordinate axis $X_1$ and a vector from the foregoing point $V_1$ can be obtained. Simultaneously, record the minimum angle $\theta_{1,2}$.

(3) Next, adopt a point ($V_3$) with which a minimum angle between the first coordinate axis $X_1$ and a vector from the foregoing point $V_2$ can be obtained. Simultaneously, record the minimum angle $\theta_{2,3}$.

(4) Repeat the similar processing until coming back to the initial point $V_1$ from a point $V_n$. Record the minimum angle $\theta_{n,1}$.

In this manner, a group of points $\{V_1, V_2, \ldots, V_n\}$ that defines the convex polygon is selected. The permissible maximum variation range is defined by the group of points $\{V_1, V_2, \ldots, V_n\}$ in the model parameter space. The same applies to a case of a multidimensional model parameter space.

As described above, the permissible range data 30 which indicates the permissible maximum variation range RPM and the like is created. The permissible range data 30 is referred to mainly at a time of updating a statistical cell library described later (refer to Step S80; Section 2-8). As will be described later, the permissible maximum variation range RPM indicates a variation range in which re-characterization of a cell is not required after the manufacturing process is changed.

2-4. Response Function (Step S40)

Next, modeling of a cell characteristic is explained. The cell characteristics include timing characteristics such as a delay time, a transition time and setup/hold times and power characteristics of a primitive logic circuit. As an example, modeling of a delay time $\tau$ of a primitive logic circuit will be described below. The same applies to the other cell characteristics.

Figure 9:
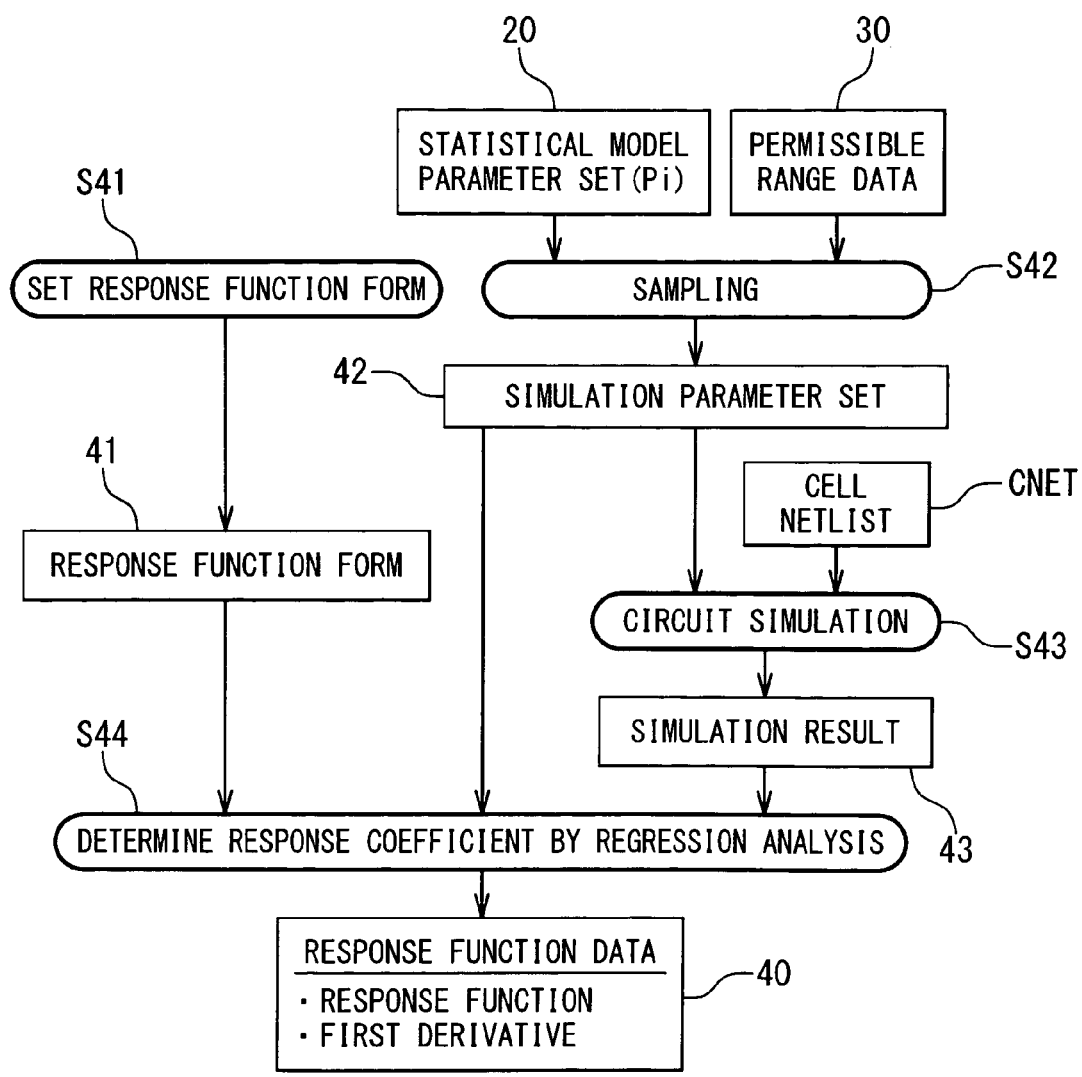
FIG. 9 is a flow diagram showing creation processing of response function data.

In Step S40, a response function that expresses response of the delay time $\tau$ of the cell to the statistical model parameters $P_i$ is created. FIG. 9 shows an example of processing flow of creating the response function.

Step S41:

First, a response function form 41 is set. As an example, let us consider a case where the delay time $\tau$ is approximated by a second-order polynomial. In this case, the delay time $\tau$ and the first derivation thereof are expressed as the following equations (2) and (3), respectively.

$$\tau = \tau nom + \sum_{i=1}^{Np} A_i \cdot \Delta P_i + \sum_{i=1}^{Np} A_{ii} \cdot (\Delta P_i)^2 + \sum_{i \neq j}^{Np} \sum_{j \neq i}^{Np} A_{ij} \cdot \Delta P_i \cdot \Delta P_j \quad (2)$$

$$\left(\frac{\partial \tau}{\partial P_i}\right) = A_i + 2 \cdot A_{ii} \cdot \Delta P_i + \sum_{i \neq j}^{Np} A_{ij} \cdot \Delta P_j \quad (3)$$

In the equation (2), $\tau nom$ is an expected value (nominal value) of the delay time $\tau$. The delay time $\tau$ is dependent on the variation $\Delta P_i$ ($=P_i-P_{io}$) from the design value $P_{io}$ of the statistical model parameter $P_i$ (i=1 to Np). Parameters $A_i$, $A_{ii}$ and $A_{ij}$ are response coefficients. The total number of the response coefficients is Np(Np+1).

Step S42:

Next, simulation parameter sets 42 which are sets of the statistical model parameters $P_i$ used in the SPICE simulation are created. For example, the nominal value $P_{io}$ of the statistical model parameter $P_i$ is changed variously within the permissible nominal variation range RPN given by the permissible range data 30. Consequently, various kinds of the simulation parameter sets 42 can be created.

Step S43:

Next, the SPICE simulation is performed. Input to the SPICE simulation are a cell netlist CNET and the above-mentioned simulation parameter sets 42. As a result of the SPICE simulation using the statistical model parameters $P_i$, the delay time $\tau$ of the cell is calculated. The delay time $\tau$ is calculated for all of the simulation parameter sets 42, and a simulation result 43 is output.

Step S44:

Next, the response coefficients $A_i$, $A_{ii}$ and $A_{ij}$ are determined. More specifically, each of the simulation parameter sets 42 is substituted for the right-hand side of the response function form 41 (see equation (2)), and the corresponding simulation result 43 is substituted for the left-hand side of the response function form 41. Then, a regression analysis is performed to determine the response coefficients $A_i$, $A_{ii}$ and $A_{ij}$. In this manner, the response function expressing the delay time $\tau$ of the cell is created. A response function data 40 includes both of the response function expressed as the above equation (2) and the first derivative expressed as the above equation (3).

It should be noted that the delay time $\tau$ is dependent also on conditions such as input transition time, output load capacitance, temperature, power supply voltage and the like. Therefore, the response function data 40 is so created as to cover conditions within an appropriate range. Alternatively, the response function data 40 may be separately created for each of various conditions. In this case, the response function 40 shall be created for each condition at which a statistical cell library described below is defined.

2-5. Statistical Cell Library (Step S50)

In Step S50, a statistical cell library 50 that expresses the cell characteristic statistically is created. The statistical cell library 50 is used for verification of the semiconductor integrated circuit and the like. As described above, the cell characteristics include the timing characteristics and the power characteristics. As an example, a statistical cell library 50 with regard to the delay time $\tau$ of the primitive logic circuit will be described below. The same applies to the other cell characteristics.

The statistical cell library 50 that gives the delay time $\tau$ of a cell may also be called a timing library (or delay library). The timing library 50 is used in the statistical STA. The delay time $\tau$ is dependent on conditions such as the input transition time, the output load capacitance, the temperature, the power supply voltage and the like. Therefore, the timing library 50 is so created as to give the delay times $\tau$ at various conditions.

Variation of the delay time $\tau$ from the expected value (nominal value) $\tau nom$ is expressed by $\Delta \tau$ ($=\tau-\tau nom$). By using the above equation (1), the variation $\Delta \tau$ can be expressed as the following equation (4) without losing generality.

$$\Delta \tau = \sum_{i=1}^{Np} \frac{\partial \tau}{\partial P_i} \cdot \Delta P_i \quad (4)$$

$$= \sum_{i=1}^{Np} \frac{\partial \tau}{\partial P_i} \cdot (P_i - P_{io})$$

$$= \sum_{i=1}^{Np} \frac{\partial \tau}{\partial P_i} \cdot \sum_{k=1}^{M} G_{ik} \cdot N_k$$

The equation (4) is rewritten to obtain the following equations (5) and (6).

$$\Delta \tau = \sum_{k=1}^{M} S_k \cdot N_k \quad (5)$$

$$S_k = \frac{\partial \tau}{\partial N_k} = \sum_{i=1}^{Np} \frac{\partial \tau}{\partial P_i} \cdot G_{ik} \quad (6)$$

The above equation (5) is the model that expresses the statistical variation $\Delta \tau$ of the delay time $\tau$. The statistical variation $\Delta \tau$ is expressed by a combination of product of a parameter $S_k$ and the above-mentioned variability factor variable $N_k$ (distribution function). It should be noted here that the variability factor variable $N_k$ (distribution function) included in the statistical model parameter $P_i$ is used without modification. The parameter $S_k$ is "sensitivity" of the statistical variation $\Delta \tau$ to the variability factor variable $N_k$, and the total number of the sensitivity $S_k$ is M (k=1 to M). As can be seen from the equation (6), the sensitivity $S_k$ can be calculated based on the aforementioned response function. More specifically, the sensitivity $S_k$ can be calculated by using the first derivative of the response function (refer to the equation (3)) and the coefficient matrix $G_{i,k}$.

The statistical cell library 50 regarding the delay time τ gives the nominal value (expected value) τnom and the statistical variation Δτ. That is to say, the statistical cell library 50 indicates the nominal value τnom, the sensitivity $S_k$ and the variability factor variable $N_k$. The nominal value τnom is calculated for each of various conditions by using the response function. The sensitivity $S_k$ is calculated for each of various conditions by using the response function and the statistical model parameters $P_i$. As to the variability factor variable $N_k$, the variability factor variable $N_k$ included in the statistical model parameter $P_i$ is used without modification. Therefore, the statistical cell library 50 according to the present embodiment can be determined by just using the response function and the statistical model parameters $P_i$.

2-6. Process Changes (Step S60)

The manufacturing process of the semiconductor integrated circuit is progressing from day to day. With maturation of the manufacturing process, the manufacturing variability is supposed to be improved. When the manufacturing variability is improved, it is possible to reduce a margin to be considered in the circuit design/verification. This leads to reduction in the circuit area and power consumption. It is therefore desirable to update the statistical cell library 50 in accordance with the maturation of the manufacturing process. Moreover, there may be a case where impurity concentrations of wells and diffusion layers are adjusted and thus the transistor characteristics are changed. It is also desirable to update the statistical cell library 50 in such a case where the manufacturing process is purposely changed. In order to reflect the latest manufacturing process in the statistical cell library 50, the following processing is performed.

2-7. Update Statistical Model Parameter (Step S70)

First, the statistical model parameters $P_i$ are updated in accordance with the change in the manufacturing process. A method of creating new statistical model parameters $P_i'$ corresponding to the latest manufacturing process is the same as that explained in the foregoing Steps S10 and S20. The new statistical model parameters $P_i'$ are extracted based on the latest device characteristic data 10'. Similarly to the equation (1), the latest statistical model parameter $P_i'$ thus obtained is expressed as the following equation (7).

$$P_i' = P_{io}' + \Delta P_i' \quad (7)$$

$$= P_{io}' + \sum_{k=1}^{M} G_{ik}' \cdot N_k'(\mu', \sigma')$$

$$= P_{io} + \Delta P_{io} + \sum_{k=1}^{M} G_{ik}' \cdot N_k'(\mu', \sigma')$$

Here, $P_{io}'$ is the latest design value (nominal value, targeted value). $\Delta P_i'$ is the latest variation. $N_k'(\mu', \sigma')$ is the latest variability factor parameter. The variability factor variable $N_k'$ is expresses as a normal distribution with a mean value $\mu'$ and a standard deviation $\sigma'$. Typically, the standard deviation $\sigma'$ becomes smaller than the standard deviation $\sigma'$ before update due to the maturation of the manufacturing process. $G_{i,k}'$ is the latest coefficient matrix. $\Delta P_{io}$ ($=P_{io}'-P_{io}$) is a variation amount of the nominal value between before and after the update. The latest statistical model parameter set 20' is thus created.

2-8. Check Permissible Variation Range (Step S80)

Next, a "post-update variation range" which is an index of a variation range covered by the latest statistical model parameter set 20' is calculated. The post-update variation range can be calculated for each type of transistors by the same method as described in the foregoing Step S30, as in the case of the permissible variation range indicated by the permissible range data 30.

Subsequently, a comparison is made between the "permissible variation range" and the "post-update variation range". If the post-update variation range is included in the permissible variation range, it can be said that the current cell modeling is at least valid. Therefore, there is no need to perform the re-characterization of the cell. Then, the statistical cell library 50 is updated in order to reflect the latest manufacturing process in the statistical cell library 50 (refer to Step S90; Section 2-9).

As in the case of the permissible variation range, the post-update variation range can include a post-update maximum variation range RPM' and a post-update nominal variation range RPN'. The condition where the re-characterization is not necessary is that the post-update maximum variation range RPM' is included in the permissible maximum variation range RPM and the post-update nominal variation range RPN' is included in the permissible nominal variation range RPN.

For example, a method to check whether the post-update maximum variation range RPM' is included in the permissible maximum variation range RPM is as follows. The permissible maximum variation range RPM is the convex polygon defined by the points $\{V_1, V_2, \ldots, V_n\}$ in the model parameter space. On the other hand, the post-update maximum variation range RPM' is assumed to be within a convex polygon defined by points $\{W_1, W_2, \ldots, W_m\}$ in the model parameter space. In this case, the following conditions just need to be checked.

(1) Values of the respective points $W_p$ (p=1 to m) are all larger than the value of the aforementioned point $V_1$ on the first coordinate axis $X_1$.

(2) Angles from the point $V_1$ to the respective points $W_p$ are all larger than the aforementioned angle $\theta_{1,2}$.

(3) Angles from the point $V_2$ to the respective points $W_p$ are all larger than the aforementioned angle $\theta_{2,3}$.

(4) Repetition of similar condition. Lastly, angles form the point $V_n$ to the respective points $W_p$ are all larger than the aforementioned angle $\theta_{n,1}$.

Alternatively, the following check method is also possible. $VW_p$ is vector notation of the point $W_p$ (p: 1 to m), and $VV_q$ is vector notation of the point $V_q$ (q: 1 to n). In this case, it is just checked that cross product: $(VV_r-VV_q) \times (VW_p-VV_q)$ is positive for all the combinations. Here, r is given by r=mod(q, n)+1.

As described above, the permissible variation range is checked before updating the statistical cell library 50. If the post-update variation range is included in the permissible variation range, the statistical cell library 50 is just updated without performing the re-characterization of the cell. If the post-update variation range departs from the permissible variation range, on the other hand, the re-characterization of the cell is necessary.

2-9. Update Statistical Cell Library (Step S90)

In Step S90, the statistical cell library 50 is updated. Targets of the update include the nominal value τnom, the sensitivity $S_k$ and the variability factor variable $N_k$. As described above, the statistical model parameters $P_i$ (refer to the equation (1)) are changed to the new statistical model parameters $P_i'$ (refer to the equation (7)). The statistical cell library 50 can be updated by using the new statistical model parameters $P_i'$ and the response function given by the response function data 40. How to update the statistical cell library 50 depends on the change between the statistical model parameter $P_i$ and the statistical model parameter $P_i'$.

<Update of Variation>

First, let us consider a case where the variation $\Delta P_i$ of the statistical model parameter $P_i$ is changed to $\Delta P_i'$. In this case, at least one of the variability factor variable $N_k$ and the coefficient matrix $G_{i,k}$ in the statistical model parameters $P_i$ is changed. This typically corresponds to a case where the manufacturing process is matured and thus the manufacturing variability is reduced.

If the variability factor variable $N_k(\mu, \sigma)$ of the statistical model parameter $P_i$ is changed to $N_k'(\mu', \sigma')$, the variability factor variable $N_k$ in the statistical cell library 50 is replaced by the new variability factor variable $N_k'$. This operation is considerably simple and easy. The reason why such a simple and easy operation is possible is that both of the statistical model parameter $P_i$ and the statistical cell library 50 include the same parameters $N_k$.

Furthermore, the sensitivity $S_k$ is updated by using the response function. More specifically, the sensitivity $S_k$ is calculated again by using the above equations (6) and (3). The new sensitivity $S_k'$ is given by the following equations (8) and (9). In the equations (8) and (9), the new coefficient matrix $G_{i,k}'$ and the new variation $\Delta P_i'$ of the statistical model parameters $P_i'$ are used.

$$S_k' = \sum_{i=1}^{Np} \left(\frac{\partial \tau}{\partial P_i}\right)' \cdot G_{ik}' \quad (8)$$

$$\left(\frac{\partial \tau}{\partial P_i}\right)' = A_i + 2 \cdot A_{ii} \cdot \Delta P_i' + \sum_{i \neq j}^{Np} A_{ij} \cdot \Delta P_j' \quad (9)$$

In this manner, the variability factor variable $N_k$ in the statistical cell library 50 can be easily updated to the new variability factor variable $N_k'$. Also, the sensitivity $S_k$ in the statistical cell library 50 can be easily updated to the new sensitivity $S_k'$.

Update of Nominal>

Next, let us consider a case where the nominal value $P_{io}$ of the statistical model parameter $P_i$ is changed to $P_{io}'$ ($=P_{io}+\Delta P_{io}$). Here, $\Delta P_{io}'$ ($=P_{io}'-P_{io}$) is a variation amount of the nominal value between before and after the update. In this case, the nominal value $\tau$nom and the sensitivity $S_k$ in the statistical cell library 50 are updated by using the response function. A new nominal value $\tau$nom' is calculated by the following equation (10). In the equation (10), the variation amount $\Delta P_{io}$ is used.

$$\tau\text{nom}' = \quad (10)$$
$$\tau\text{nom} + \sum_{i=1}^{Np} A_i \cdot \Delta P_{io} + \sum_{i=1}^{Np} A_{ii} \cdot (\Delta P_{io})^2 + \sum_{i \neq j}^{Np} \sum_{j \neq i}^{Np} A_{ij} \cdot \Delta P_{io} \cdot \Delta P_{jo}$$

Furthermore, the sensitivity $S_k$ is updated by using the response function. More specifically, the sensitivity $S_k$ is calculated again by using the above equations (6) and (3). The new sensitivity $S_k'$ is given by the following equations (11) and (12).

$$S_k' = \sum_{i=1}^{Np} \left(\frac{\partial \tau}{\partial P_i}\right)' \cdot G_{ik}' \quad (11)$$

$$\left(\frac{\partial \tau}{\partial P_i}\right)' = A_i + 2 \cdot A_{ii} \cdot \Delta P_{io} + \sum_{i \neq j}^{Np} A_{ij} \cdot \Delta P_{jo} \quad (12)$$

In this manner, the nominal value $\tau$nom in the statistical cell library 50 can be easily updated to the new nominal value $\tau$nom'. Also, the sensitivity $S_k$ in the statistical cell library 50 can be easily updated to the new sensitivity $S_k'$.

A combination of the update of variation and the update of nominal is also possible. In this case, the nominal value $\tau$nom, the sensitivity $S_k$ and the variability factor variable $N_k$ in the statistical cell library 50 are updated.

In this manner, a statistical cell library 50' after update can be easily created. When updating the statistical cell library 50, there is no need to perform the SPICE simulation which incurs calculation costs, and just the operations of the analytic functions is enough. Since the SPICE simulation is not required, it is possible to promptly update the statistical cell library 50 at low costs.

Note that if the total number M of the variability factor variables $N_k$ is increased due to the change in the statistical model parameters $P_i$, the response function needs to be reconstructed. Also, if the kinds of the selected statistical model parameters $P_i$ are changed, the response function needs to be reconstructed. In these cases, it is necessary to perform the above-mentioned Steps S30 to S50.

2-10. Effects

According to the present embodiment, as described above, it is possible to promptly update the statistical cell library 50 without performing the circuit simulation, when the statistical model parameter $P_i$ is changed. In other words, it is possible to promptly update the statistical cell library 50 at low costs, in accordance with the maturation and change of the manufacturing process. There is no need to perform the re-characterization of the cell. Consequently, the latest manufacturing process can be immediately reflected in the circuit design/verification. Accordingly, it is possible to efficiently develop the semiconductor integrated circuit. Since the margin to be considered in the circuit design/verification is reduced when the manufacturing variability is improved due to the maturation of the manufacturing process, effects of reduction in the circuit area and power consumption can be obtained.

2-11. Margin

According to the present embodiment, it is also possible to calculate "margin MR" of the above-mentioned permissible variation range. The margin MR is defined as a difference between the "permissible variation range" associated with the statistical model parameters $P_i$ and the "post-update variation range" associated with the new statistical model parameters $P_i'$. That is to say, the margin MR indicates how much the new statistical model parameters $P_i'$ have margin within the existing permissible variation range and how much the variability is reduced.

Figure 10:
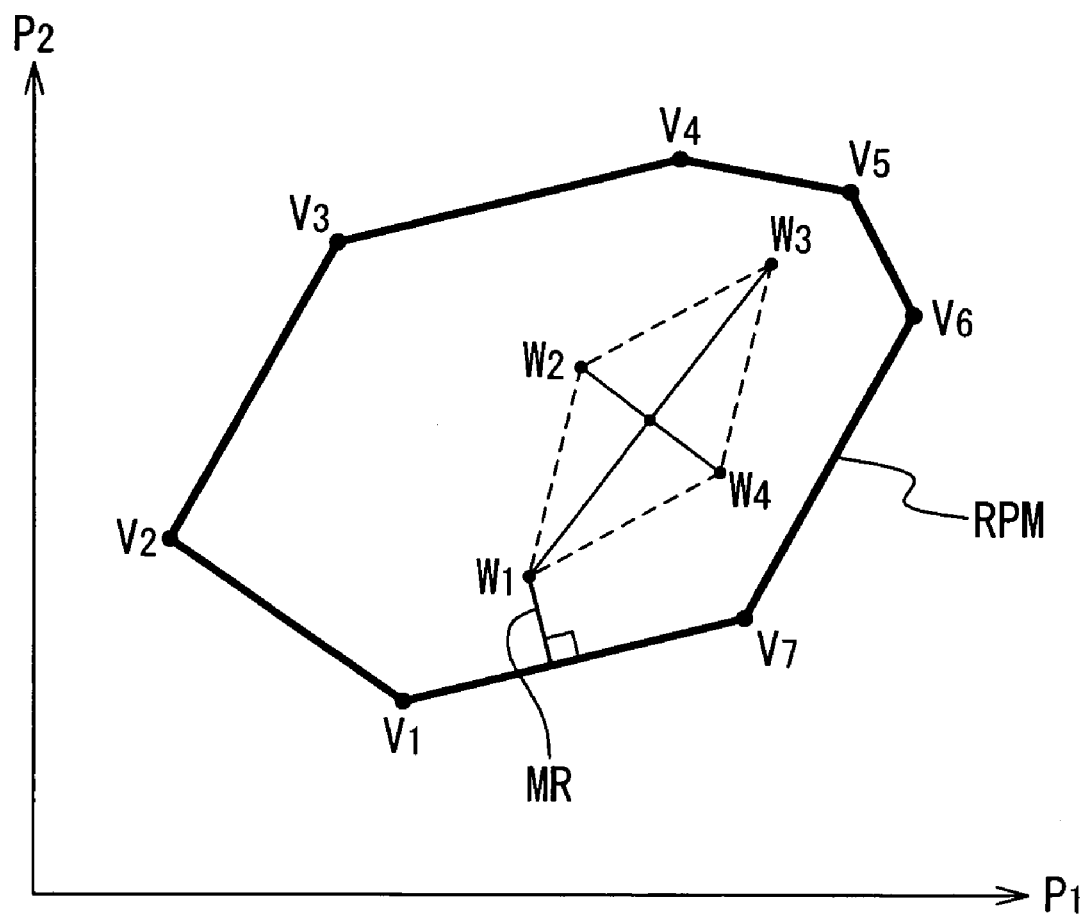
FIG. 10 is a conceptual diagram showing margin of the permissible variation range.

FIG. 10 is a conceptual diagram showing an example of the margin MR of the permissible variation range RPM. The permissible variation range RPM corresponds to a convex polygon region defined by a set of points $V_q$ (q: 1 to n). The post-update variation range is defined by a set of points $W_p$ (p:

1 to m). In this case, the margin MR is calculated to be the shortest distance between points $W_p$ and the outermost circumference planes of the convex polygon region of the permissible variation range RPM. It can be easily obtained by a method similar to algorithms to constitute Delauney triangulation. In the example shown in FIG. 10, a distance between the point $W_1$ and a plane defined by the points $V_1$ and $V_7$ (a line in the case of two dimension) is the margin MR.

Alternatively, the margin MR can also be expressed as the following equation (13). In the equation (13), $VW_p$ is vector notation of the point $W_p$ (p: 1 to m), and $VV_q$ is vector notation of the point $V_q$ (q: 1 to n). $(VV_r-VV_q) \times (VW_p-VV_q)$ expresses cross product, and r is given by r=mod(q, n)+1 (refer to the foregoing Section 2-8).

$$MR = \min\left(\frac{(\vec{VV_r} - \vec{VV_q}) \times (\vec{VW_p} - \vec{VV_q})}{|\vec{VV_r} - \vec{VV_q}|}\right) \quad (13)$$

In this manner, the margin MR can be calculated based on the permissible variation range and the post-update variation range, when the manufacturing process is changed. The calculated margin MR quantitatively represents the degree of variability reduction. It is therefore possible to feed back the calculated margin MR to the manufacturing process and/or the design/verification of the semiconductor integrated circuit. For example, if the margin MR indicates a sufficient margin, the manufacturing process may be simplified. Also, if the margin MR indicates a sufficient margin, the timing constraints in the timing verification may be loosened.

2-12. Core Macro Modeling

The elementary circuit includes a core macro circuit such as a memory, a PLL and an analog circuit, other than the primitive logic circuit such as a AND gate and a flip-flop. Once a core macro circuit is developed, the core macro circuit is basically utilized over a long period of time. It is therefore desirable that the core macro circuit needs not be redesigned even if the manufacturing process is changed.

For example, the core macro circuit is so modeled as to cover all the possible manufacturing variability. For that purpose, as to the core macro circuit, the statistical model parameters $P_i$ (core macro model parameters) are so created as to cover both of the "global variability" between chips and the "local variability" within one chip.

More specifically, statistical model parameters $P_i$ which cover the global variability are created based on the device characteristic data 10 in which the global variability is taken into consideration. Also, statistical model parameters $P_i$ which cover the local variability are created based on the device characteristic data 10 in which the local variability is taken into consideration. Then, these two types of the statistical model parameters $P_i$ are combined to create the core macro model parameters. The permissible variation range with regard to the core macro model parameters includes both of the "permissible global variation range" associated with the global variability and the "permissible local variation range" associated with the local variability.

Figure 11:
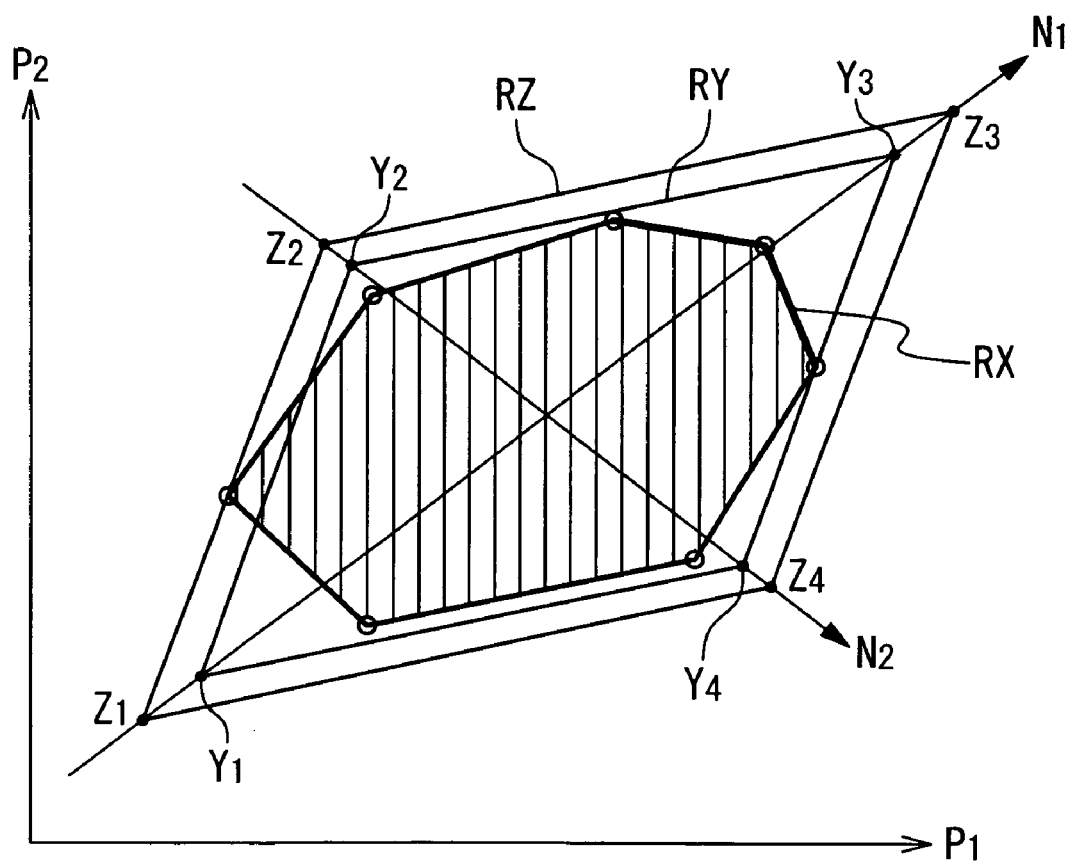
FIG. 11 is a conceptual diagram showing an example of a method of creating statistical model parameters with respect to a core macro circuit.

In a case of a large number of element types used, however, a total number of the statistical model parameters $P_i$ becomes large, which causes increase in load of the circuit design/verification. In order to avoid the problem, the device characteristics of all types of elements used may be combined and the statistical model parameters $P_i$ may be created based on the combined device characteristics. FIG. 11 is a conceptual diagram for explaining the method. For simplicity, let us consider a model parameter space defined by the two statistical model parameters $P_1$ and $P_2$ as in the case of FIG. 7.

As in the case of the calculation of the permissible variation range, points representing maximum values and minimum values of a certain range along the principal component directions are first extracted with respect to each type of elements. For example, points representing maximum values and minimum values of a certain range ($\pm 3\sigma_k$) along the principal component directions are extracted with respect to each of the three types of transistors (TRA, TRB and TRC) having different diffusion conditions (refer to FIG. 7). Then, a convex polygon (range RX) that is defined by outermost circumference points among the plurality of points in the model parameter space is determined.

Next, the device characteristics of all types of elements used are combined, and a principal component analysis is performed with respect to the combined device characteristics. At this time, the combined device characteristics are assumed to be normally-distributed. As a result of the principal component analysis of the combined device characteristics, new statistical model parameters are created. The new statistical model parameters are referred to as "combined model parameters" hereinafter. With regard to a distribution of the combined model parameters, points representing maximum values and minimum values of a certain range along the principal component directions are extracted. In the example shown in FIG. 11, four points $Y_1, Y_2, Y_3$ and $Y_4$ are extracted. A rectangle defined by the four points $Y_1, Y_2, Y_3$ and $Y_4$ is referred to as a "combined variation range RY" hereinafter.

The above-mentioned range RX may depart from the combined variation range RY. In this case, the combined variation range RY is expanded along the principal component directions so as to include the range RX. The combined variation range RY after the expansion is referred to as an "expanded variation range RZ" hereinafter. The expanded variation range RZ is a rectangle defined by points $Z_1, Z_2, Z_3$ and $Z_4$, and includes the above-mentioned range RX and combined variation range RY. To expand the combined variation range RY to be the expanded variation range RZ corresponds to adjustment of variability components of the combined model parameters along the principal component directions.

The combined model parameter is expressed as the following equation (14) wherein global variability components and local variability components are combined. $M_G$ and $M_L$ are total numbers of global variability factor variables $N_k(0, \sigma_{Gk})$ and local variability factor variables $N_k(0, \sigma_{Lk})$, respectively. $\sigma_{Gk}$ and $\sigma_{Lk}$ are standard deviations of the global variability factor variable $N_k$ and the local variability factor variable $N_k$, respectively. $G_{Gik}$ and $G_{Lik}$ are coefficient matrices that represent degrees of contribution of the global variability factor variables $N_k$ and the local variability factor variables $N_k$, respectively.

$$P_i = P_{io} + \sum_{k=1}^{M_G} G_{Gik} \cdot N_k(0, \sigma_{Gk}) + \sum_{k=1}^{M_L} G_{Lik} \cdot N_k(0, \sigma_{Lk}) \quad (14)$$

By adjusting the variability components of the combined model parameters along the principal component directions, core macro model parameters $P_i$(core) are created. The core macro model parameter $P_i(\text{core})$ is expressed as the following equations (15) to (19).

$$P_i(\text{core}) = P_{io} + \sum_{k=1}^{M_G} G_{Gik}(\text{core}) \cdot N_k(0,1) + \sum_{k=1}^{M_L} G_{Lik}(\text{core}) \cdot N_k(0,1) \quad (15)$$

$$G_{Gik}(\text{core}) = \left(\frac{SG_{i,max}}{\sum_l (G_{Gil} \cdot \sigma_{Gl})^2}\right) \cdot G_{Gik} \cdot \sigma_{Gk} \quad (16)$$

$$G_{Lik}(\text{core}) = \left(\frac{SL_{i,max}}{\sum_l (G_{Lil} \cdot \sigma_{Ll})^2}\right) \cdot G_{Lik} \cdot \sigma_{Lk}$$

$$SG_{i,max} = \max(SG_{i,TRA}, SG_{i,TRB}, \ldots) \quad (17)$$
$$SL_{i,max} = \max(SL_{i,TRA}, SL_{i,TRB}, \ldots)$$

$$SG_{i,element}^2 = \sum_k (G_{Gik,element} \cdot \sigma_{Gk,element})^2 \quad (18)$$

$$SL_{i,element}^2 = \sum_k (G_{Lik,element} \cdot \sigma_{Lk,element})^2$$

$$\text{Variance}(P_i(\text{core})) = SG_{i,max}^2 + SL_{i,max}^2 \quad (19)$$

Here, $G_{Gik}$ (core) and $G_{Lik}$ (core) are coefficient matrices scaled for the global variability and the local variability, respectively. $SG_{i,element}$ and $SL_{i,element}$ are standard deviations of the statistical model parameter $P_i$ of a transistor specified by the letter "element". $SG_{i,max}$ and $SL_{i,max}$ are maximum values of the standard deviations of the statistical model parameters $P_i$ with regard to the global variability and the local variability, respectively. The core macro model parameter $P_i$ (core) is capable of representing larger variability than any type of the transistors.

It should be noted that the combined device characteristics do not always exhibit a normal distribution. Therefore, it is also possible to employ corner model parameters for the global variability while the combined model parameters for the local variability. Here, the corner model parameters mean a set of model parameters corresponding to the maximum values and the minimum values of the statistical model parameters along the principal component directions. In the example shown in FIG. 11, the four points $Z_1$, $Z_2$, $Z_3$ and $Z_4$ correspond to the corner model parameters. In this case, the core macro model parameter $P_i$(core) can be expressed as the following equation (20).

$$P_i(\text{core}) = P_{io} \pm n \cdot SG_{i,max} + \sum_{k=1}^{M_L} G_{Lik}(\text{core}) \cdot N_k(0,1) \quad (20)$$

By using the core macro model parameters described above, a core macro model 60 which expresses characteristics of the core macro circuit is created. Validity of the core macro model 60 is at least ensured within a range (permissible variation range) in which the statistical cell library 50 of the primitive logic circuit can be changed. In other words, as long as the post-update variation range is within the permissible variation range (refer to the section 2-8, Step S80), the core macro model 60 is valid and redesign thereof is not necessary. With regard to the core macro circuit designed by using the core macro model 60, a sufficient margin is ensured within a variation range of the statistical models of the primitive logic circuit.

3. Circuit Design and Verification (Step S3)

Figure 12:
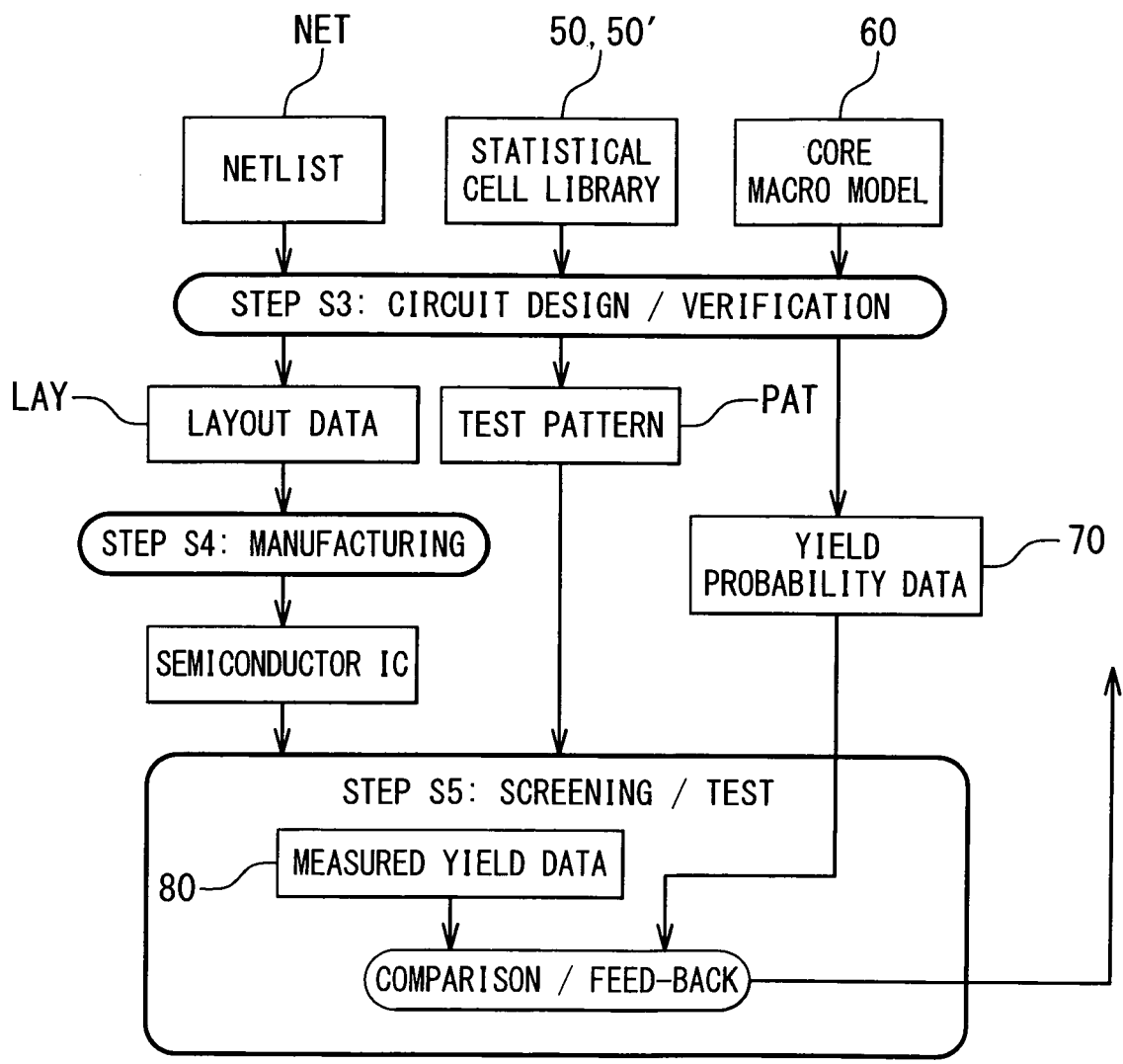
FIG. 12 is a conceptual diagram showing data flow in Steps S3 to S5.

Processing after the statistical models are created will be described below. FIG. 12 is a conceptual diagram showing data flow in Steps S3 to s5.

In Step S3, design and verification of a semiconductor integrated circuit are performed. The circuit design is performed based on the cell-based design technique. More specifically, cell placement and routing are performed based on a netlist NET of the design object circuit. As a result, a layout data LAY indicating a layout of the design object circuit is created.

Also, a test pattern PAT is generated based on the design result. The test pattern PAT is used later for detecting malfunction of the designed circuit.

In a verification stage of the designed circuit, various verifications such as layout verification and timing verification are performed. In the layout verification, it is checked whether or not the created layout data LAY meets a given design rule. In the timing verification, a timing analysis is performed to check whether or not the designed circuit meets given timing constraints.

In the present embodiment, SSTA (Statistical Static Timing Analysis) is performed as the timing analysis. In the SSTA, the above-described statistical cell library 50 obtained in Step S2 is used. That is, the nominal value (expected value) $\tau$nom and the statistical variation $\Delta\tau$ of the delay time $\tau$ given by the statistical cell library 50 are used, and thereby the timing analysis is performed in a statistical manner. It should be noted that since the timing analysis is performed in a statistical manner, it is also possible to calculate probability that the designed circuit meets the given timing constraints. The calculated probability is a "timing yield predicted value" that is a predicted value of timing yield based on the statistical approach.

If the verification result is "Fail", the design and layout are modified. The design and verification processes are repeated until the verification result becomes "Pass". For example, the design and verification processes are repeated until the calculated timing yield predicted value becomes equal to or larger than a predetermined timing yield target value. That is, the design and layout are optimized such that a desired timing yield is to be ensured. The calculated timing yield predicted value is provided as a yield probability data 70, which is referred to in Step S5 described later.

According to the present embodiment, the design margin is optimized by the statistical approach. Therefore, the circuit design/verification is performed efficiently.

4. Manufacturing (Step S4)

In Step S4, the semiconductor integrated circuit is actually manufactured on the basis of the determined layout data LAY. More specifically, a mask data is created from the determined layout data LAY. Subsequently, a reticle used in the photolithography technique is fabricated on the basis of the mask data. The semiconductor integrated circuit is manufactured through various processes such as the photolithography using the reticle. In the manufacturing, the latest manufacturing process is applied.

5. Screening and Test (Step S5)

In Step S5, screening and test of the manufactured semiconductor integrated circuit are performed. For example, an operation test of the semiconductor integrated circuit is performed by using the test pattern PAT which is generated beforehand in the foregoing Step S3. Through the operation test, defective products are rejected. At this time, an actual yield of the manufactured semiconductor integrated circuit is measured. A measured yield data 80 indicates the obtained actual yield. It should be noted that the actual yield depends on both of a defect yield related to physical defects and a timing yield related to the timing.

In the present embodiment, a comparison is made between the measured yield data 80 and the yield probability data 70 obtained in Step S3. That is, a comparison is made between the actual yield (Ya) and the timing yield predicted value (Ys). Then, the comparison result is fed-back to the circuit design/verification (Step S3) and/or the manufacturing process change (Step S1). In other words, the comparison result is used as a criterion to determine how to change the circuit design/verification and the manufacturing process.

Figure 13:
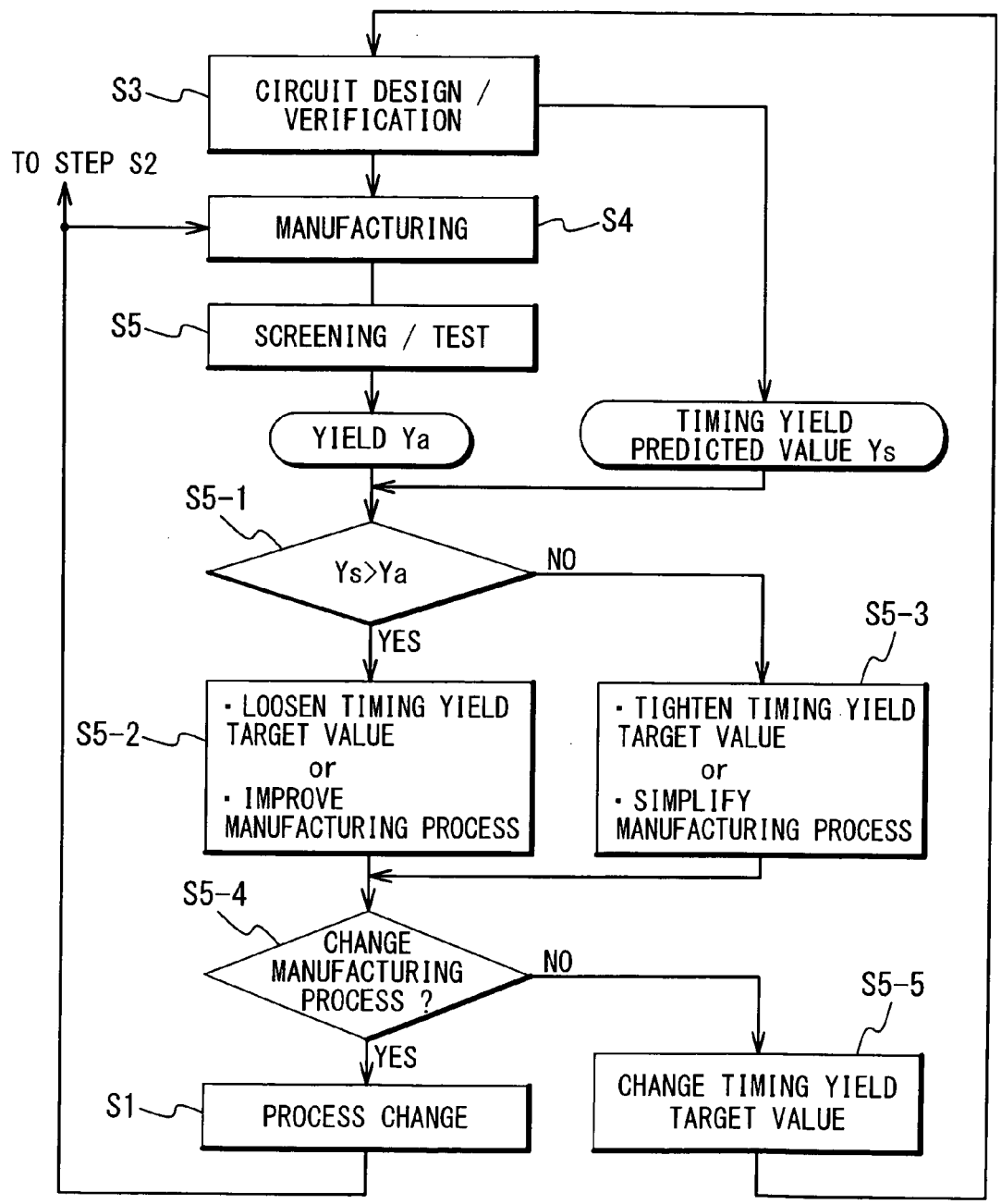
FIG. 13 is a flowchart showing an example of feed-back algorithm.

FIG. 13 is a flowchart showing an example of the feed-back algorithm. In Step S5-1, the actual yield Ya is compared with the timing yield predicted value Ys.

First, let us consider a case where the actual yield Ya is lower than the timing yield predicted value Ys, i.e. the actual yield Ya is worse (Step S5-1; Yes). In this case, physical defects are supposed to be dominant, and efforts in the circuit design are less likely to improve the yield. Therefore, the following choices are evaluated (Step S5-2). The first choice is to improve the manufacturing process. In this case, the defect yield is expected to be improved and thus the actual yield Ya is improved. The second choice is to loosen the "timing yield target value" that has been considered in the timing analysis. In this case, time and costs required for the circuit design/verification are reduced. Moreover, since the design margin is reduced, the circuit area and power consumption are reduced.

Next, let us consider a case where the actual yield Ya is higher than the timing yield predicted value Ys, i.e. the timing yield predicted value Ys is worse (Step S5-1; No). In this case, there is a high possibility that effect of the circuit design on the yield is more than that of the physical defects. Therefore, the following choices are evaluated (Step S5-3). The first choice is to tighten the timing yield target value. In this case, the yield Ya could be improved. The second choice is to simplify the manufacturing process. In this case, the manufacturing costs can be reduced.

Next, which choice to select is determined (Step S5-4). If to change the manufacturing process is selected (Step S5-4; Yes), the manufacturing process is changed (Step S1). That is, the processing returns back to Step S1 (see FIG. 2). Typically, the manufacturing process is improved within the permissible variation range. Furthermore, the statistical models are updated in accordance with the change in the manufacturing process (Step S2, Steps S60 to S90; refer to Section 2 and FIG. 3). Effects of tuning of the manufacturing process on the circuit characteristics can be promptly examined by utilizing the method of updating the statistical models according to the present embodiment. Moreover, the change in the manufacturing process is reflected in Step S4.

On the other hand, if to change the timing yield target value is selected (Step S5-4; No), the timing yield target value is changed (Step S5-5). The timing yield target value after change is referred to in the timing verification in Step S3.

According to the present embodiment, as described above, the result of the comparison between the actual yield Ya and the timing yield predicted value Ys is fed-back to the upstream processes. This feed-back serves as a part of the "process maturity feed-back system" according to the present embodiment.

6. Indicator Circuit Monitoring (Step S6)

In Step S6, actual manufacturing variability is monitored by measuring device characteristic of an indicator circuit embedded in the semiconductor integrated circuit. The indicator circuit is exemplified by a single transistor or a ring oscillator. The device characteristic of the indicator circuit is exemplified by an oscillation frequency of the ring oscillator or current consumption. Based on a result of the monitoring, it is possible to assess the validity of the statistical models created in Step S2.

For that purpose, the permissible variation range with regard to the device characteristic of the indicator circuit is also calculated in the foregoing Step S2. More specifically, the device characteristic of the indicator circuit is expressed by using principal components in a form similar to the foregoing equation (1). The method is the same as the method of determining the statistical model parameters $P_i$ (refer to Steps S10 and S20). Then, the permissible variation range with regard to the device characteristic of the indicator circuit is calculated. The calculation method is the same as that for the permissible variation range with regard to the statistical model parameters $P_i$ (refer to Step S30). As a result, the permissible range data 30 with regard to the indicator circuit is created.

After the semiconductor integrated circuit is manufactured, the device characteristic of the indicator circuit is measured. An actual distribution (actual manufacturing variability) of the device characteristic of the indicator circuit can be obtained by make the measurement with respect to a large number of chips. Consequently, an indicator circuit characteristic data 90 which indicates the device characteristic distribution of the indicator circuit is created.

Next, a comparison is made between the permissible range data 30 and the indicator circuit characteristic data 90. It is thus possible to check whether or not the actual distribution of the device characteristic of the indicator circuit is included in the permissible variation range. This corresponds to checking whether the statistical models used in the circuit design cover the actual manufacturing variability. That is to say, it is possible to assess the validity of the statistical models by monitoring the indicator circuit.

If the actual distribution of the device characteristic of the indicator circuit departs from the permissible variation range, the statistical models may be revised. Alternatively, the manufacturing process may be reexamined. In this manner, the monitoring result of the indicator circuit is fed-back to the statistical models (Step S2) and/or the manufacturing process (Step S1) (see FIG. 2).

Moreover, it is possible to comprehend variation of the manufacturing variability in a relatively long span by regularly measuring the indicator circuit characteristic of test chips. It is also possible to comprehend long-term variations of the global variability and the local variability. If improvement of the manufacturing variability exhibits a monotonic increase tendency, the statistical models may be updated every time a new integrated circuit is developed, in order to reflect variability characteristics of the latest manufacturing process in the product development.

Moreover, when the manufacturing process is changed, it is possible to promptly assess effects of the process change by monitoring the indicator circuit.

According to the present embodiment, as described above, the actual manufacturing variability and its variation are monitored. The monitoring result is fed-back to the manufacturing process and/or the design processes. This feed-back also serves as a part of the "process maturity feed-back system" according to the present embodiment.

7. Circuit Design System

Figure 14:
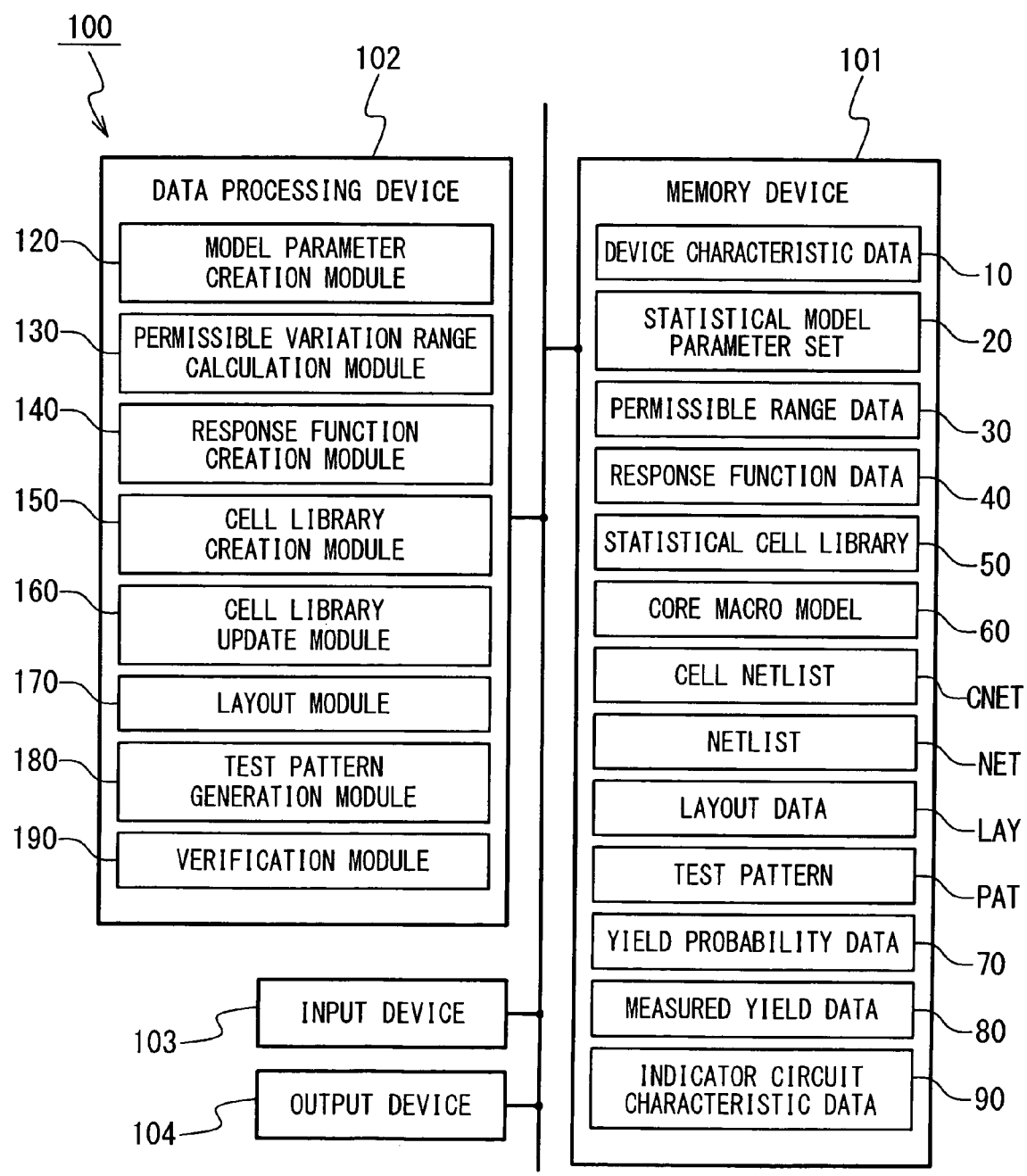
FIG. 14 is a block diagram showing a configuration of a circuit design system.

The above-described technique according to the present embodiment can be achieved by a computer system. FIG. 14 is a block diagram showing a configuration example of a circuit design system 100 according to the present embodiment. The circuit design system 100 is provided with a memory device 101, a data processing device 102, an input device 103 and an output device 104. The memory device 101 includes a RAM and a HDD. The input device 103 includes a keyboard and a mouse. The output device 104 includes a display.

Stored in the memory device 101 are the device characteristic data 10, the statistical model parameter set 20, the permissible range data 30, the response function data 40, the statistical cell library 50, the core macro model 60, the yield probability data 70, the measured yield data 80, the indicator circuit characteristic data 90, the cell netlist CNET, the netlist NET, the layout data LAY, the test pattern PAT and so on.

The data processing device 102 reads necessary data from the memory device 101 to process data, and stores necessary data in the memory device 101. More specifically, the data processing device 102 is provided with a model parameter creation module 120, a permissible variation range calculation module 130, a response function creation module 140, a cell library creation module 150, a cell library update module 160, a layout module 170, a test pattern generation module 180, a verification module 190 and so on. These modules are achieved by cooperation of an arithmetic processing unit and computer program, and provide specific functions respectively.

The model parameter creation module 120 provides functions of Steps S20 and S70. That is, the model parameter creation module 120 creates the statistical model parameter set 20 and the core macro model parameters of a cell on the basis of the device characteristic data 10.

The permissible variation range calculation module 130 provides a function of Step S30. That is, the permissible variation range calculation module 130 calculates the permissible variation range and creates the permissible range data 30.

The response function creation module 140 provides a function of Step S40. That is, the response function creation module 140 performs a circuit simulation by using the statistical model parameter set 20 and creates the response function data 40 on the basis of the simulation result.

The cell library creation module 150 provides a function of Step S50. That is, the cell library creation module 150 creates the statistical cell library 50 and the core macro model 60 by using the statistical model parameter set 20, the permissible range data 30 and the response function data 40.

The cell library update module 160 provides functions of Steps S80 and S90. That is, the cell library update module 160 checks the permissible variation range by referring to the permissible range data 30. Then, the cell library update module 160 updates the statistical cell library 50 by using the new statistical model parameter set 20' and the response function data 40 to create the new statistical cell library 50'.

The layout module 170, the test pattern generation module 180 and the verification module 190 provide a function of Step S3. More specifically, the layout module 170 performs the cell placement and routing based on the netlist NET to create the layout data LAY. The test pattern generation module 180 generates the test pattern PAT. The verification module 190 performs verification of the designed circuit by using the statistical cell library 50 and the core macro model 60. Also, the verification module 190 performs the timing analysis to create the yield probability data 70.

As described above, the present embodiment provides the process maturity feed-back system that is useful for developing and producing a semiconductor integrated circuit.

It is apparent that the present invention is not limited to the above embodiments and may be modified and changed without departing from the scope and spirit of the invention.

What is claimed is:

1. A production method for a semiconductor integrated circuit, the method comprising:
   creating a model parameter of an element constituting a cell, wherein said model parameter is defined by a design value and a distribution function of variability from said design value;
   performing a circuit simulation using said model parameter to create a response function that expresses a response characteristic of said cell to said model parameter;
   creating a statistical cell library by using said response function, wherein said statistical cell library gives an expected value and a statistical variation of said response characteristic of said cell, wherein said statistical variation is expressed by a product of said distribution function and a sensitivity, wherein said sensitivity is calculated based on said response function;
   updating said statistical cell library when said model parameter is updated in accordance with a change of a manufacturing process of said semiconductor integrated circuit, wherein said statistical cell library is updated by using said model parameter after said update and said response function without performing a circuit simulation;
   designing and verifying a semiconductor integrated circuit by using said updated statistical cell library; and
   manufacturing said designed semiconductor integrated circuit.

2. The production method according to claim 1, wherein, when said distribution function is changed in updating said model parameter, said statistical cell library is updated by replacing said distribution function in said statistical variation, and said sensitivity is calculated again by using said response function.

3. The production method according to claim 1, wherein, when said design value is changed in said updating said model parameter, said statistical cell library is updated by calculating said expected value and said sensitivity again by using said response function.

4. The production method according to claim 1, wherein, when said model parameter is created, a permissible range data indicating a permissible variation range is created, and
   wherein said permissible variation range comprises an index of a variation range covered by said created model parameter and is defined by a maximum value and a minimum value of a predetermined range along a principal component direction of said distribution function.

5. The production method according to claim 4, wherein said updating said statistical cell library comprises:
   calculating a post-update variation range that comprises an index of a variation range covered by said model parameter after said update, in a same manner as in said permissible variation range;
   comparing said post-update variation range with said permissible variation range; and
   updating said statistical cell library if said post-update variation range is included in said permissible variation range.

6. The production method according to claim 5, further comprising:
   calculating a margin that indicates a difference between said permissible variation range and said post-update variation range; and
   feeding back said calculated margin to said manufacturing process of said semiconductor integrated circuit.

7. The production method according to claim 5, further comprising:
- calculating a margin that indicates a difference between said permissible variation range and said post-update variation range; and
- feeding back said calculated margin to said designing and verifying of said semiconductor integrated circuit.

8. The production method according to claim 4, wherein when said model parameter is created, a core macro model parameter that comprises said model parameter of a core macro circuit is created based on said permissible variation range, and
- wherein said core macro model parameter is created to cover both of a global variability between chips and a local variability within a chip.

9. The production method according to claim 8, wherein said core macro model parameter is determined such that said permissible variation range with regard to said core macro model parameter includes both of said permissible variation range associated with said global variability and said permissible variation range associated with said local variability.

10. The production method according to claim 4, further comprising:
- calculating said permissible variation range with regard to a device characteristic of an indicator circuit embedded in said semiconductor integrated circuit;
- measuring an actual distribution of said device characteristic of said indicator circuit included in said manufactured semiconductor integrated circuit;
- comparing said actual distribution with said permissible variation range with regard to said device characteristic of said indicator circuit; and
- feeding back a result of the comparison to creating of said statistical cell library or said manufacturing process.

11. The production method according to claim 1, wherein said designing and verifying said semiconductor integrated circuit includes:
- designing said semiconductor integrated circuit;
- calculating a timing yield predicted value by using said statistical cell library, wherein said timing yield predicted value comprises a probability that said designed semiconductor integrated circuit meets timing constraints; and
- repeating said designing of said semiconductor integrated circuit and said calculating of said timing yield predicted value until said calculated timing yield predicted value becomes equal to or larger than a predetermined yield target value.

12. The production method according to claim 11, further comprising:
- performing a test of said manufactured semiconductor integrated circuit to measure a yield;
- comparing said yield with said timing yield predicted value; and
- feeding back a result of the comparing to said verifying or said manufacturing process of said semiconductor integrated circuit.

13. The production method according to claim 12, wherein, when said yield is lower than said timing yield predicted value, said manufacturing process is improved or said predetermined yield target value is loosened, and
- wherein when said yield is higher than said timing yield predicted value, said manufacturing process is simplified or said predetermined yield target value is tightened.

14. A design method for a semiconductor integrated circuit, the method comprising:
- creating, using a processor on a computer, a model parameter of an element constituting a cell, wherein said model parameter is defined by a design value and a distribution function of variability from said design value;
- performing a circuit simulation, using said model parameter to create a response function that expresses a response of a characteristic of said cell to said model parameter;
- creating a statistical cell library by using said response function, wherein said statistical cell library gives an expected value and a statistical variation of said characteristic of cell, wherein said statistical variation is expressed by a product of said distribution function and a sensitivity, wherein said sensitivity is calculated based on said response function;
- updating said statistical cell library when said model parameter is updated in accordance with a change of a manufacturing process of said semiconductor integrated circuit, wherein said statistical cell library is updated by using said model parameter after update and said response function without performing a circuit simulation; and
- designing and verifying a semiconductor integrated circuit by using said updated statistical cell library.

15. The design method according to claim 14, wherein, when said model parameter is created, a permissible range data indicating a permissible variation range is created,
- wherein said permissible variation range comprises an index of a variation range covered by said created model parameter and is defined by a maximum value and a minimum value of a predetermined range along a principal component direction of said distribution function, and
- wherein said updating said statistical cell library includes:
  - calculating a post-update variation range that comprises an index of a variation range covered by said model parameter after update, in a same manner as in said permissible variation range;
  - comparing said post-update variation range with said permissible variation range; and
  - updating said statistical cell library if said post-update variation range is included in said permissible variation range.

16. A design system for a semiconductor integrated circuit, comprising:
- a model parameter creation module, as executed by a processor on a computer, configured to create a model parameter of an element constituting a cell, wherein said model parameter is defined by a design value and a distribution function of variability from said design value;
- a permissible variation range calculation module configured to create a permissible range data indicating a permissible variation range, wherein said permissible variation range comprises an index of a variation range covered by said created model parameter and is defined by a maximum value and a minimum value of a predetermined range along a principal component direction of said distribution function;
- a response function creation module configured to perform a circuit simulation using said model parameter to create a response function that expresses a response of a characteristic of said cell to said model parameter;
- a library creation module configured to create a statistical cell library by using said response function, wherein said statistical cell library gives an expected value and a statistical variation of said characteristic of said cell, wherein said statistical variation is expressed by a product of said distribution function, and a sensitivity, wherein said sensitivity is calculated based on said response function; and an update module configured to update said statistical cell library when said model parameter is updated, wherein said update module calculates a post-update variation range that is an index of a variation range covered by said model parameter after update, and wherein when said post-update variation range is included in said permissible variation range, said update module updates said statistical cell library by using said model parameter after update and said response function without performing a circuit simulation.

* * * * *